(12) United States Patent
Saga

(10) Patent No.: US 8,203,649 B2
(45) Date of Patent: Jun. 19, 2012

(54) IMAGE PROCESSING APPARATUS AND IMAGE PROCESSING METHOD

(75) Inventor: Yoshihiro Saga, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1134 days.

(21) Appl. No.: 12/044,806

(22) Filed: Mar. 7, 2008

(65) Prior Publication Data

US 2008/0226197 A1    Sep. 18, 2008

(30) Foreign Application Priority Data

Mar. 15, 2007   (JP) ................................. 2007-067596

(51) Int. Cl.
*H04N 7/01*       (2006.01)
*H04N 11/20*      (2006.01)

(52) U.S. Cl. ........ 348/441; 348/431; 348/451; 348/452; 348/450; 348/437; 348/415; 348/715; 348/716; 348/438; 382/100; 382/254

(58) Field of Classification Search .................. 348/441, 348/431, 451, 452, 700, 569, 448, 450, 437, 348/438, 415, 715, 716; 382/100, 254
See application file for complete search history.

(56) References Cited

U.S. PATENT DOCUMENTS

| | | | | |
|---|---|---|---|---|
| 5,151,784 | A | * | 9/1992 | Lavagetto et al. ........ 375/240.12 |
| 5,818,537 | A | * | 10/1998 | Enokida et al. ............... 348/441 |
| 5,825,429 | A | * | 10/1998 | Shirahata ...................... 348/448 |
| 6,525,783 | B1 | * | 2/2003 | Kim et al. ...................... 348/714 |
| 2004/0085480 | A1 | | 5/2004 | Salzer et al. |
| 2004/0218828 | A1 | * | 11/2004 | Aiso ............................. 382/254 |
| 2005/0184949 | A1 | * | 8/2005 | Kamimura ....................... 345/98 |
| 2005/0243216 | A1 | * | 11/2005 | Salzer et al. ................... 348/701 |
| 2008/0187170 | A1 | * | 8/2008 | Matsubayashi ............... 382/100 |

FOREIGN PATENT DOCUMENTS

| | | |
|---|---|---|
| JP | 10-191268 A | 7/1998 |
| JP | 2000-181440 A | 6/2000 |
| JP | 2003-187243 A | 7/2003 |
| JP | 2004-120757 A | 4/2004 |
| JP | 2007-041595 A | 2/2007 |
| JP | 2008-160591 A | 7/2008 |
| JP | 2008-166969 A | 7/2008 |
| WO | 2007/040045 A | 4/2007 |

OTHER PUBLICATIONS

Japanese Office Action for Application No. 2007-067596 dated Jan. 27, 2012.

* cited by examiner

*Primary Examiner* — Jefferey Harold
*Assistant Examiner* — Mustafizur Rahman
(74) *Attorney, Agent, or Firm* — Carter, DeLuca, Farrell & Schmidt LLP

(57) ABSTRACT

An apparatus includes a memory which successively stores frame data of video data, an interpolating unit which generates interpolation frame data which is inserted between the frame data and stores the interpolation frame data in the memory, and a readout unit which successively reads out the frame data and the interpolation frame data from the memory at a frame rate higher than a frame rate of the video data. The apparatus further includes a generating unit which generates image data which is composited with the frame data and stores the image data in the memory, and a control unit which, based on display-related characteristics of the image data, controls the interpolating unit to halt the generation of the interpolation frame data, and also controls the readout unit to read out the frame data in duplicate instead of the interpolation frame data.

11 Claims, 23 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method that accelerate the frame rate of video data.

2. Description of the Related Art

There are at present time well-known techniques for accelerating the frame rate of video data (see Japanese Patent Laid-Open No. 10-191268). In accordance with the technique of Japanese Patent Laid-Open No. 10-191268, a video signal having 50 frames per second is converted to 100 frames per second using field interpolation.

Furthermore, it is also known to display menu screens and other images (computer graphics) by compositing them with video images, with images of increasingly higher quality (e.g. high-definition animation images, etc.) being composited in recent years. A display device including circuitry that generates computer graphics signals is disclosed in Japanese Patent Laid-Open No. 2000-181440.

When interpolation frames are generated based on field interpolation etc., large amounts of data are read out from a frame memory as well as written to a frame memory.

In addition, when image data representing high-quality images is generated, large amounts of data are also read out from a frame memory as well as written to a frame memory.

Therefore, compositing high-quality images with video simultaneously with frame rate acceleration requires the data transmission bandwidth of the frame memory to be expanded. However, it is difficult to expand the data transmission bandwidth as much as one might want to because the expansion of the data transmission bandwidth of the frame memory brings about a cost increase.

As a result, situations arise, in which the data transmission bandwidth creates a bottleneck and image data representing high-quality images cannot be generated.

SUMMARY OF THE INVENTION

An embodiment of the present invention provides a technology that suppresses the occurrence of situations where generation of image data representing high-quality images is impossible even if the data transmission bandwidth of the frame memory of the image processing apparatus is relatively limited.

According to an aspect of the present invention, there is provided an apparatus comprising:
  a memory which successively stores frame data of video data;
  an interpolating unit which generates interpolation frame data which is inserted between the frame data and stores the interpolation frame data in the memory;
  a readout unit which successively reads out the frame data and the interpolation frame data from the memory at a frame rate higher than a frame rate of the video data;
  a generating unit which generates image data which is composited with the frame data and stores the image data in the memory; and
  a control unit which, based on display-related characteristics of the image data, controls the interpolating unit to halt the generation of the interpolation frame data, and also controls the readout unit to read out the frame data in duplicate instead of the interpolation frame data.

According to another aspect of the present invention, there is provided an apparatus comprising:
  a storage unit which successively stores frame data of video data in a memory;
  a first converting unit which converts the frame data in a first format to a second format utilizing a smaller data volume than the first format;
  an interpolating unit which generates interpolation frame data which is inserted between the frame data in the first format or the second format and stores the interpolation frame data in the memory;
  a second converting unit which converts the interpolation frame data and the frame data in the second format to the first format;
  a readout unit which successively reads out the frame data and interpolation frame data from the memory at a frame rate higher than a frame rate of the video data;
  a generating unit which generates image data which is composited with the frame data and stores the image data in the memory; and
  a control unit which, in response to output of display-related characteristics of the image data, controls the storage unit to store the frame data after conversion to the second format with the first converting unit, controls the interpolating unit to generate interpolation frame data in the second format, and, furthermore, controls the second converting unit to convert the interpolation frame data and the frame data in the second format to the first format prior to readout by the readout unit.

According to still another aspect of the present invention, there is provided a method comprising:
  successively storing frame data of video data in a memory;
  generating interpolation frame data which is inserted between the frame data and storing the interpolation frame data in the memory;
  successively reading out the frame data and the interpolation frame data from the memory at a frame rate higher than a frame rate of the video data;
  generating image data which is composited with the frame data and storing the image data in the memory; and,
  based on display-related characteristics of the image data, determining whether to halt the generation of the interpolation frame data, and also determining whether to read out the frame data in duplicate instead of the interpolation frame data.

Further features of the present invention will become apparent from the following description of exemplary embodiments with reference to the attached drawings.

DESCRIPTION OF THE EMBODIMENTS

Preferred embodiments of the present invention will now be described with reference to attached drawings. Each embodiment described below will be helpful in understanding a variety of concepts from the generic to the more specific. It should be noted that the technical scope of the present invention is defined by claims, and is not limited by each embodiment described below. In addition, not all combinations of the features described in the embodiments are necessarily required for realizing the present invention.

In addition, in each of the following embodiments, the term "video data" is used to refer to data received by an image processing apparatus and the term "image data" is used to refer to data (e.g., data representing menu screens, etc.) that the image processing apparatus generates and composites with the video data.

First Embodiment

<Configuration of Image Processing Apparatus 10>

Figure 1:
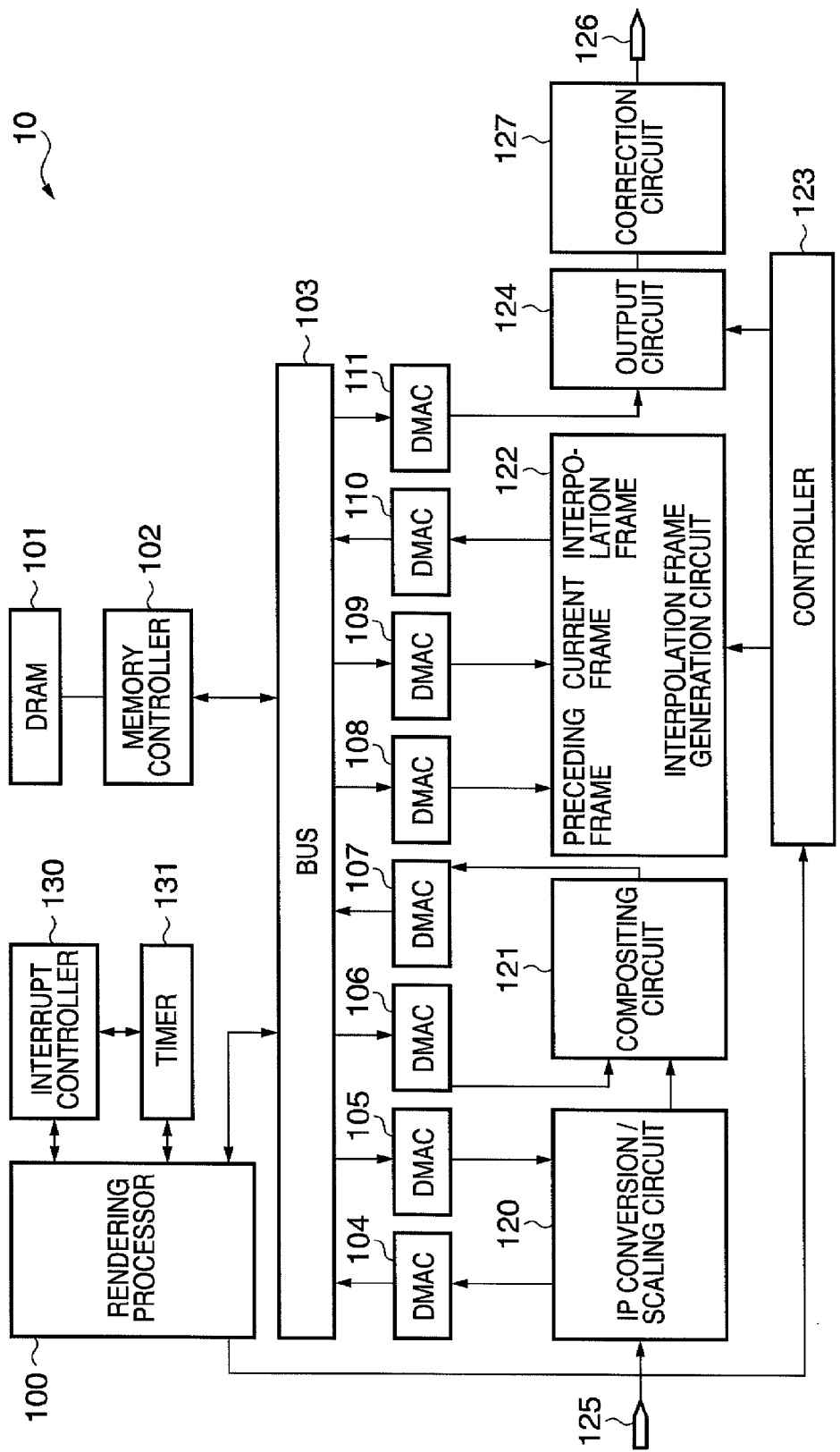
FIG. 1 is a diagram illustrating the configuration of an image processing apparatus according to a first embodiment utilizing the technology of the present invention.

FIG. 1 is a diagram illustrating the configuration of an image processing apparatus 10 according to a first embodiment utilizing the technology of the present invention.

The image processing apparatus 10 includes a rendering processor 100, which is an example of a generating unit, and an interpolation frame generation circuit 122, which is an example of an interpolating unit. The rendering processor 100 renders (generates) the image data that is composited with (each piece of frame data of) the video data. The interpolation frame generation circuit 122 generates interpolation frame data that is inserted between the frame data. The interpolation frame data is used for changing (especially, accelerating) the frame rate. Any suitable technology, such as, for instance, the one described in Japanese Patent Laid-Open No. 10-191268, can be used to generate interpolation frame data.

The reference numeral 101 designates a DRAM, which is a memory used as a frame memory for the video data and as a work area for the rendering processor 100.

The reference numeral 102 designates a memory controller and the reference numeral 103 designates a bus serving as a transmission path for data in the image processing apparatus 10. The rendering processor 100 is a processor rendering the image data and storing it in the DRAM 101.

The reference numerals 104, 105, 106, 107, 108, 109, 110 and 111 designate direct memory access controllers (DMACS) controlling data transmission between the DRAM 101 and signal processing circuits (e.g. the compositing circuit 121).

The rendering processor 100 performs the image data rendering process by executing a rendering program loaded into the DRAM 101, etc. The rendering processor 100 reads out the rendering program by way of the bus 103 and memory controller 102 and executes it.

The rendering processor 100 writes the generated image data to the DRAM 101. When the rendering processor 100 writes the image data to the DRAM 101, the image data is transmitted to the DRAM 101 by way of the bus 103 and memory controller 102.

It should be noted that the rendering processor 100 performs the rendering of image data representing menu screens, program guides, etc. by responding to user instructions and the like.

The reference numeral 125 designates an input terminal, through which video data (video signal) is provided as input. The reference numeral 126 designates an output terminal, which is connected to a display unit or another display device and outputs the video data to the display unit.

The reference numeral 120 represents an IP conversion/scaling circuit performing image processing that converts video data having an interlaced format to a progressive format, and changes the size of video images represented by video data by performing interpolation and decimation processing.

When performing image processing, the IP conversion/scaling circuit 120 has to write and read out video data to/from the DRAM 101 on a frame-by-frame or field-by-field basis. Therefore, when performing image processing, the IP conversion/scaling circuit 120 transmits video data to the DRAM 101 using the DMAC 104, bus 103, and memory controller 102. Furthermore, the video data stored in the DRAM 101 is read out using the DMAC 105, bus 103, and memory controller 102.

The reference numeral 121 designates a compositing circuit compositing the video data processed by the IP conversion/scaling circuit 120 with the image data generated by the rendering processor 100. The compositing circuit 121 can read out the image data generated by the rendering processor 100 using the DMAC 106. The compositing circuit 121 processes the image data so as to obtain a state where it is superimposed on the video data or imparts a certain transparency to the image data and composites it with the video data. The compositing circuit 121 records the video data composited with the image data in the DRAM 101 using the DMAC 107, bus 103, and memory controller 102.

The interpolation frame generation circuit 122 acquires two chronologically sequential frames of data from the DRAM 101 via the DMAC 108 and DMAC 109 and generates interpolation frame data inserted between the two frames by frame interpolation processing. The interpolation frame generation circuit 122 records the generated interpolation frame data in the DRAM 101 via the DMAC 110.

The reference numeral 124 designates an output circuit, which is an example of a readout unit that successively reads out frame data and interpolation frame data from the DRAM 101 via the DMAC 111 and outputs them to a correction circuit 127. Frame rate acceleration is accomplished as a result of the output circuit 124 reading out the frame data and interpolation frame data at a frame rate higher than the frame rate of the video data provided as input from the input terminal 125. In the present embodiment, it is assumed that the output circuit 124 can output the frame data and interpolation frame data at a frame rate of 120 frames per second or 60 frames per second.

The correction circuit 127 converts the frame data and interpolation frame data represented by luminance/color-difference signals into RGB signals, and, furthermore, corrects the color of each pixel.

Controller 123 is a circuit that controls the interpolation frame generation circuit 122 and output circuit 124 according to instructions from the rendering processor 100. The controller 123 controls the generation of interpolation frame data by the interpolation frame generation circuit 122. Moreover, the readout of frame data and interpolation frame data by the output circuit 124 is controlled by specifying addresses in the DRAM 101.

An interrupt controller 130 notifies the rendering processor 100 of interrupts. A timer 131 measures time and notifies the rendering processor 100 or interrupt controller 130 of the passage of predetermined time periods, etc. at predetermined timing intervals.

The structural elements of the image processing apparatus 10 explained above do not necessarily have to be arranged as shown in FIG. 1. For instance, the compositing circuit 121 may be arranged between the output circuit 124 and correction circuit 127. In such a case, the compositing circuit 121 composites the image data with the frame data and interpolation frame data output from the output circuit 124.

Furthermore, the video data input from the input terminal 125 may be provided not in an interlaced format, but in a progressive format. In such a case, the IP conversion/scaling circuit 120 does not need to perform IP conversion.

Moreover, the image processing apparatus 10 may be configured such that the IP conversion/scaling circuit 120 will not accept the input of video data directly; instead, video data will be stored in the DRAM 101 and then provided as input to the IP conversion/scaling circuit 120.

Regardless of the configuration of the image processing apparatus 10, the memory controller 102, bus 103, etc. constitute storage means, with the storage means successively storing the frame data of the video data received from the input terminal 125 in memory (DRAM 101).

<Interpolation Frame Data Generation Process>

As described above, the interpolation frame generation circuit 122 can generate interpolation frame data using any well-known technique. An example of the interpolation frame data generation process will be explained here with reference to FIG. 2.

Figure 2:
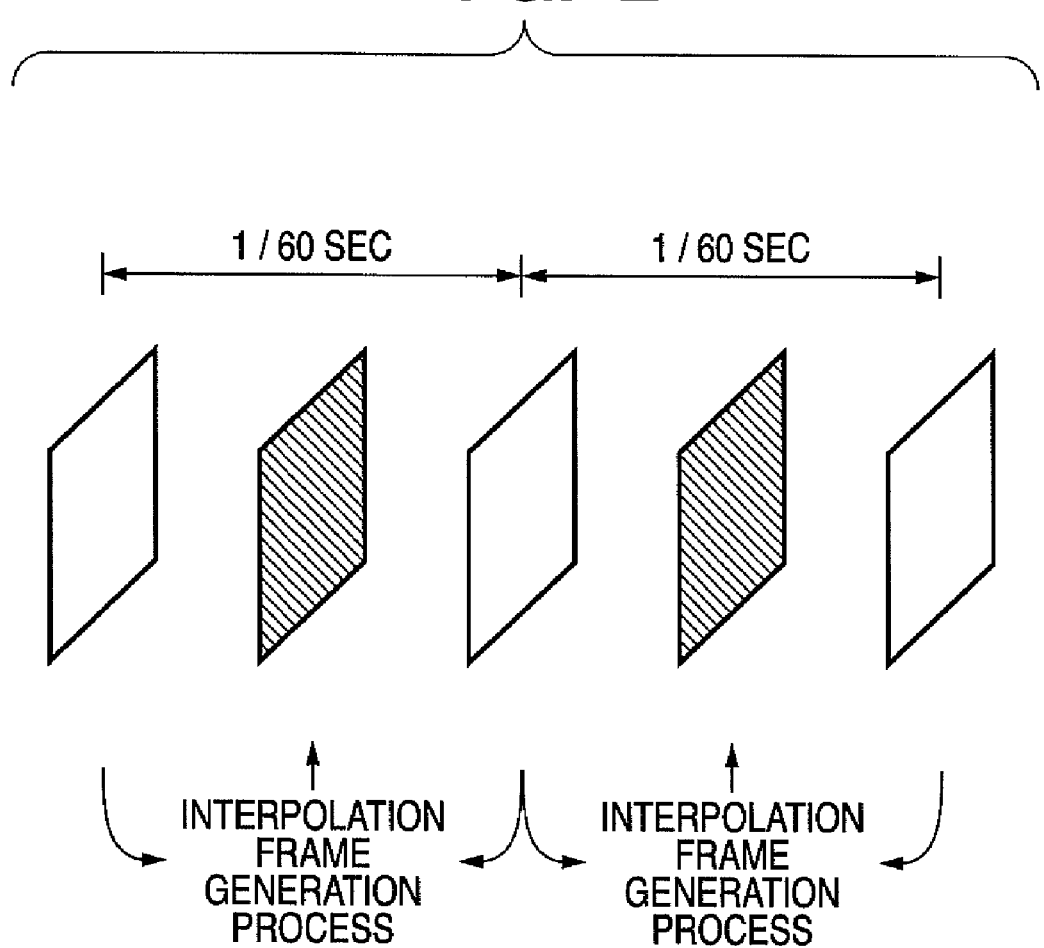
FIG. 2 is a diagram illustrating an example of the interpolation frame data generation process.

In FIG. 2, the white frames indicate 60-fps video data frames (called "original frames") provided as input to the image processing apparatus 10. In FIG. 2, the thatched frames indicate interpolation frames generated by the interpolation frame generation circuit 122 and inserted between the original frames.

The interpolation frame generation circuit 122 generates the interpolation frame data based on the frame data of two chronologically sequential original frames. In order to generate interpolation frame data, the interpolation frame generation circuit 122 can use any suitable scheme, such as, for instance, the scheme of Japanese Patent Laid-Open No. 10-191268, or a scheme involving obtaining motion vectors on a block-by-block basis and generating frames using the obtained motion vectors, etc.

The output circuit 124 successively (in chronological order) reads out the data of the original frames and the data of the interpolation frames from the DRAM 101. As a result, accelerated 120-fps video data having a doubled frame rate is obtained.

<Frame Doubling Process>

Even when no interpolation frame data is generated, the output circuit 124 can accelerate the frame rate of the video data by using the frame doubling process, which is explained with reference to FIG. 3.

Instead of using the interpolation frame data, the output circuit 124 reads out the data of each original frame in a repetitive manner (in duplicate). As a result, accelerated 120-fps video data having a doubled frame rate is obtained.

Figure 3:
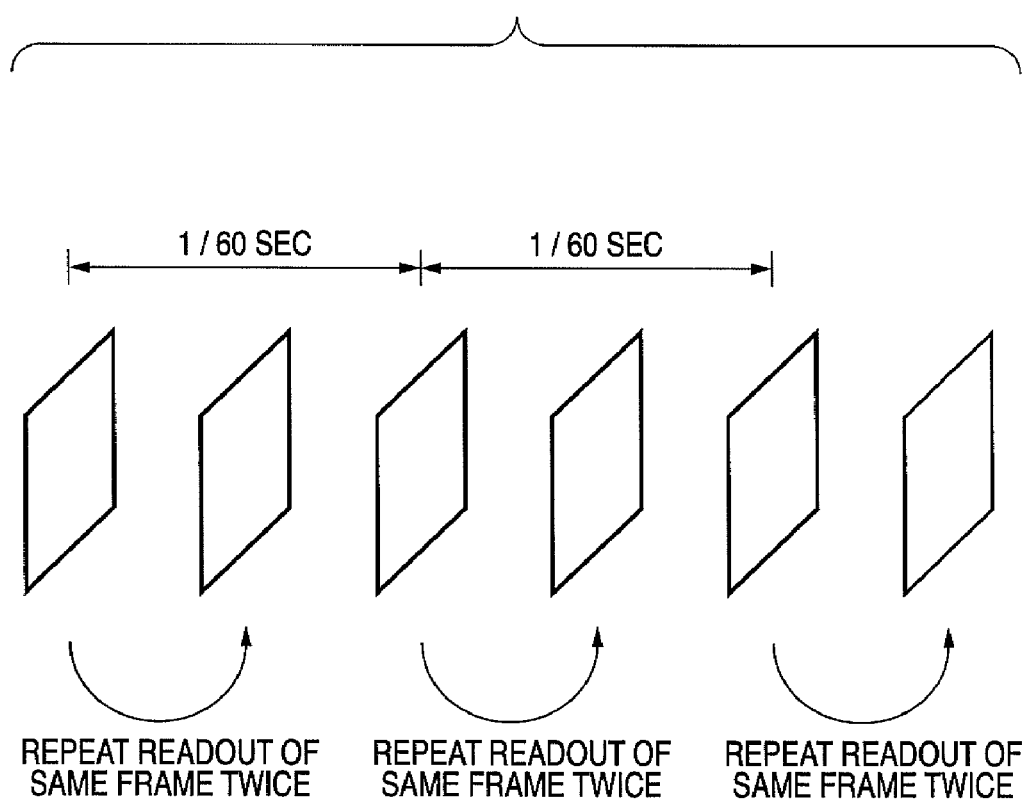
FIG. 3 is a conceptual diagram of the frame doubling process.

It should be noted that regardless of the presence or absence of interpolation frame data generation, the frequency with which the output circuit 124 reads out the frame data is not limited to the frequency described in reference to FIG. 2 and FIG. 3. For instance, in the case illustrated in FIG. 2, the frame rate is quadrupled if the output circuit 124 reads out the data of each original frame and the data of each interpolation frame twice. The important thing is that, as a result of the output circuit 124 repeatedly reading out the data of the original frames instead of using the interpolation frame data, frame rate acceleration can still be implemented even though no interpolation frame data is generated.

Furthermore, in each of the following embodiments, including the present embodiment, the term "interframe interpolation scheme" is used to refer to a frame rate acceleration scheme that makes use of the interpolation frame data generation process. Moreover, the term "frame doubling scheme" refers to a frame rate acceleration scheme utilizing the frame doubling process. Furthermore, two schemes may be co-present in a single video image (display screen).

<Amount of Consumed Transfer Bandwidth>

The amount of the transmission bandwidth of the DRAM 101 consumed when the output circuit 124 generates interpolation frame data, and when it does not generate it, will be now explained with reference to FIG. 4 and FIG. 5.

Figure 4:
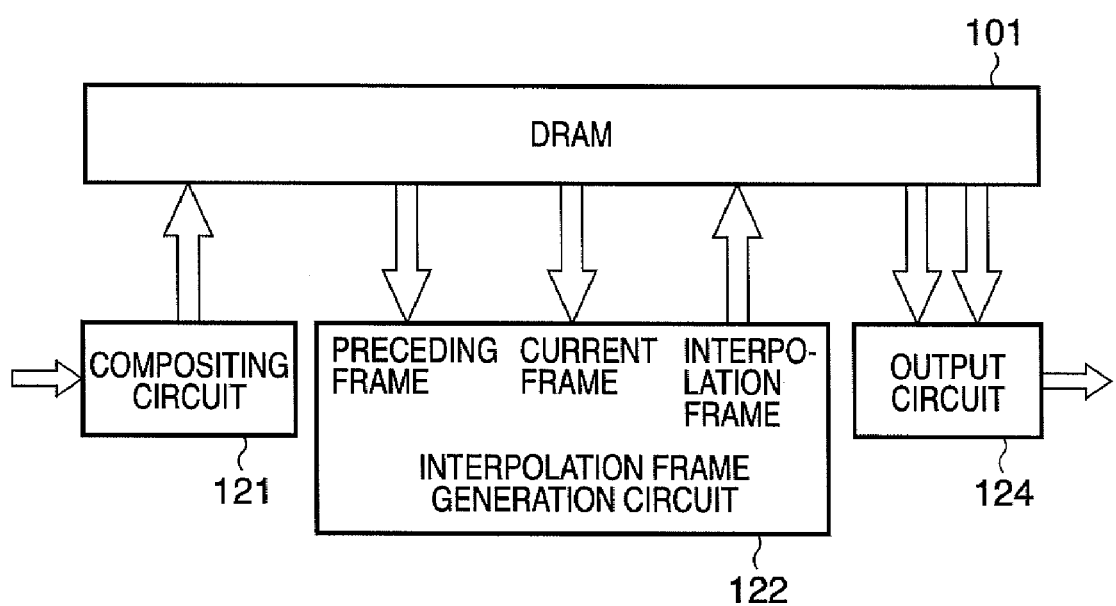
FIG. 4 is a conceptual diagram of the amount of DRAM transmission bandwidth consumed when the output circuit generates interpolation frame data.

FIG. 4 is a conceptual diagram of the amount of the transmission bandwidth of the DRAM 101 consumed when the output circuit 124 generates interpolation frame data.

While the output circuit 124 reads out the original frame data and the subsequent interpolation frame data, the interpolation frame generation circuit 122 reads out the data of two original frames from the DRAM 101 and writes the data of a single interpolation frame to the DRAM 101.

Figure 5:
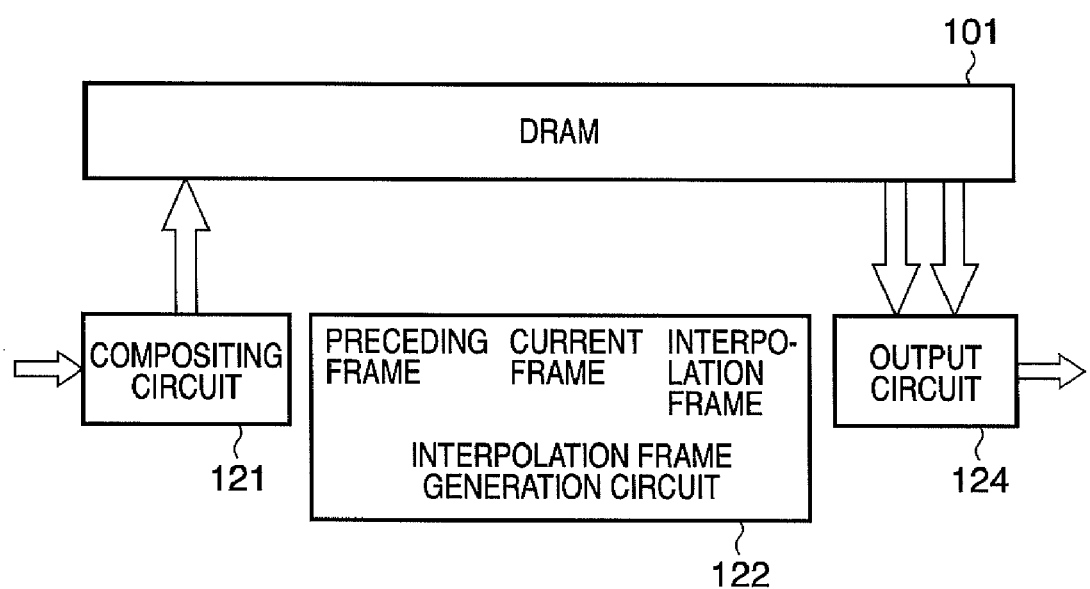
FIG. 5 is a conceptual diagram of the amount of DRAM transmission bandwidth consumed when the output circuit does not generate interpolation frame data.

FIG. 5 is a conceptual diagram of the amount of the transmission bandwidth of the DRAM 101 consumed when the output circuit 124 does not generate interpolation frame data.

The DRAM 101 is not accessed by the interpolation frame generation circuit 122 while the output circuit 124 reads out the data of the same original frame twice (no access is necessary).

Thus, the amount of consumed transmission bandwidth of the DRAM 101 decreases when the interpolation frame generation circuit 122 does not generate interpolation frame data. Image data representing images of higher quality can be generated in the DRAM 101 because the rendering processor 100 can utilize the transmission bandwidth freed by the reduction.

<Control of Interpolation Frame Generation Circuit 122 and Output Circuit 124>

As described above, when generating image data, the rendering processor 100 accesses the DRAM 101 (i.e. consumes the transmission bandwidth of the DRAM 101). Moreover, when generating interpolation frame data, the interpolation frame generation circuit 122 also consumes the transmission bandwidth of the DRAM 101.

Accordingly, in one aspect of the present embodiment, when the rendering processor 100 generates image data, the controller 123 controls the interpolation frame generation circuit 122 to halt the generation of interpolation frame data corresponding to the frame data subject to compositing. Moreover, the output circuit 124 is controlled so as to achieve frame rate acceleration by repeatedly reading out original frame data instead of using interpolation frames.

This makes it possible to generate image data representing images of higher quality because more transmission bandwidth in the DRAM 101 can be used by the rendering processor 100. In other words, this suppresses the occurrence of situations where generation of image data representing high-quality images is impossible due to a lack of transmission bandwidth.

It should be noted that, instead of halting the generation of interpolation frame data, the controller 123 may control the interpolation frame generation circuit 122 to generate interpolation frame data based on a different algorithm utilizing a smaller volume of data transmission to the DRAM 101. As a result, the amount of the transmission bandwidth of the DRAM 101 consumed by the interpolation frame generation circuit 122 decreases, albeit not down to zero, and the rendering processor 100 can use correspondingly more transmission bandwidth. In this case, the advantage is the improved image quality of the video data, whose frame rate is accelerated, in comparison with completely halting the generation of interpolation frame data. This remains the same in each of the hereinafter described other embodiments.

Incidentally, when the generated image data is simple (e.g. a small amount of still picture data), a lot of transmission bandwidth of the DRAM 101 is not required even if the rendering processor 100 generates image data.

Figure 6:
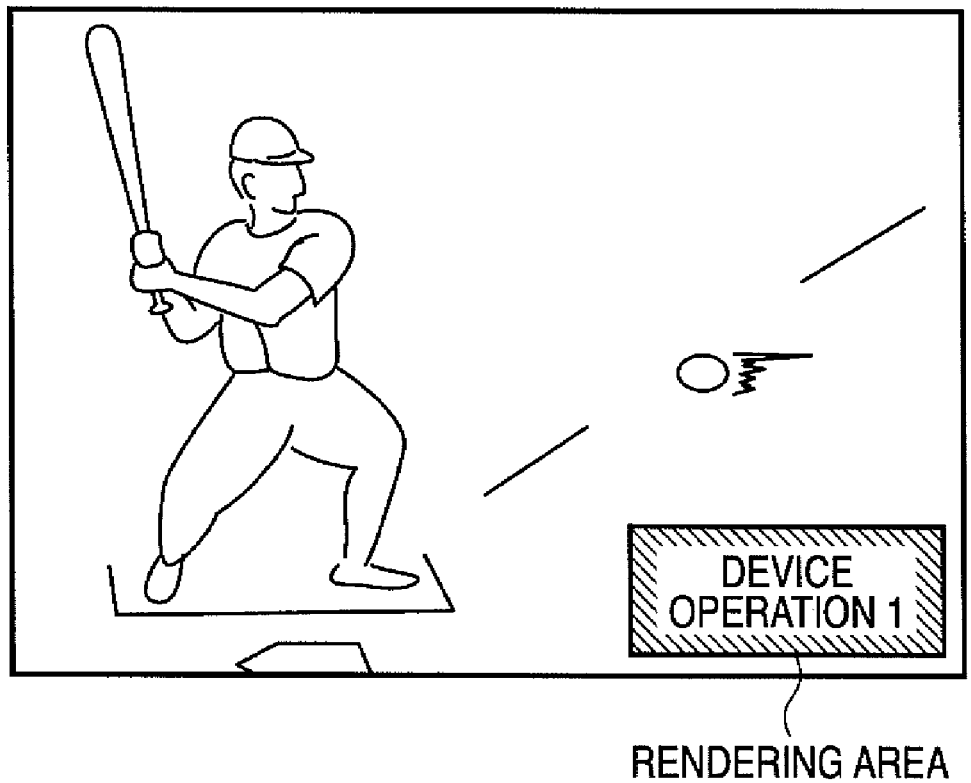
FIG. 6 is a diagram illustrating a small operating menu displayed in the lower right corner of a video image.

For instance, in FIG. 6, a small operating menu is displayed in the lower right corner of a video image. This operating menu is represented by the image data generated by the rendering processor 100. Since the size of the operating menu is small, the data volume of the image data is also relatively small and the rendering processor 100 does not need a lot of transmission bandwidth in the DRAM 101.

Figure 7:
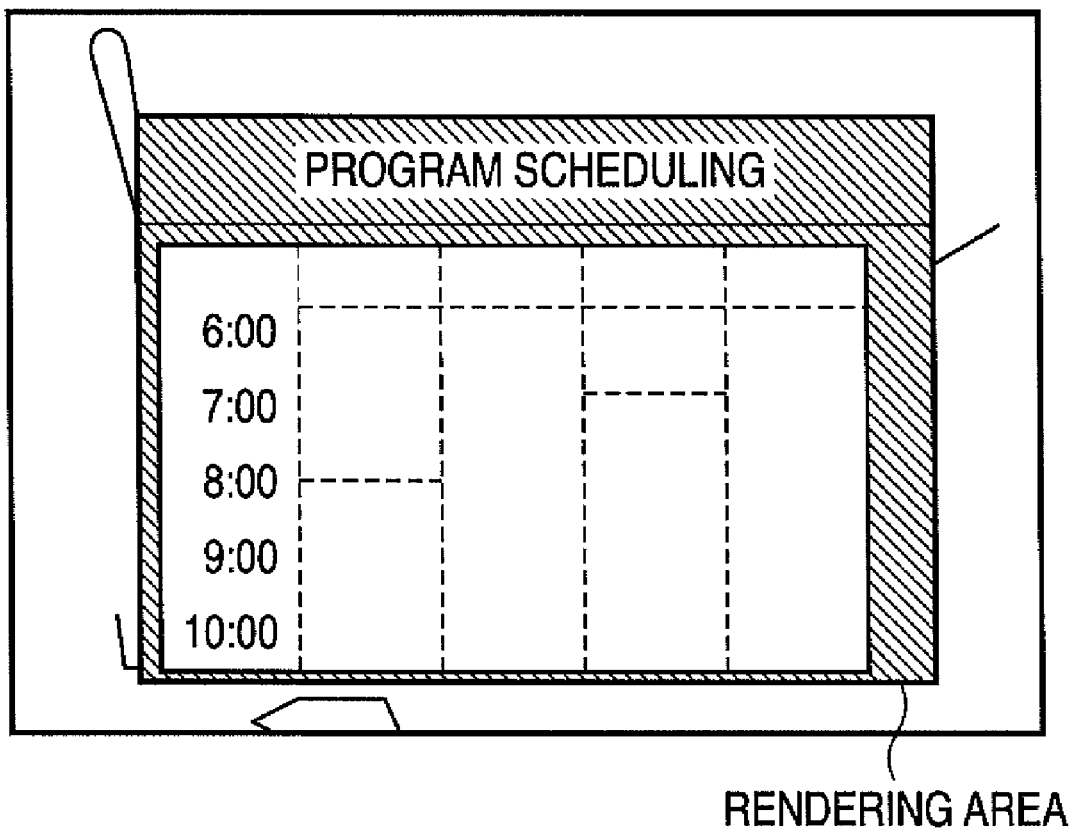
FIG. 7 is a diagram illustrating a large program guide displayed approximately in the center of a video image.

On the other hand, in FIG. 7, a large program guide is displayed approximately in the center of a video image. The data size of the image data representing this program guide is relatively large, and the rendering processor 100 requires a relatively large amount of transmission bandwidth in the DRAM 101.

Accordingly, in another aspect of the present embodiment, even when the rendering processor 100 carries out image data rendering, the controller 123 directs the interpolation frame generation circuit 122 to generate interpolation frame data if the pixel count of the image data is not more than a predetermined threshold value. The pixel count of the image data is one of the display-related characteristics of the image data. Below, this will be explained in detail with reference to the flow chart of FIG. 8. The processing of the flow chart of FIG. 8 starts when the rendering processor 100 receives an instruction regarding image data rendering.

Figure 8:
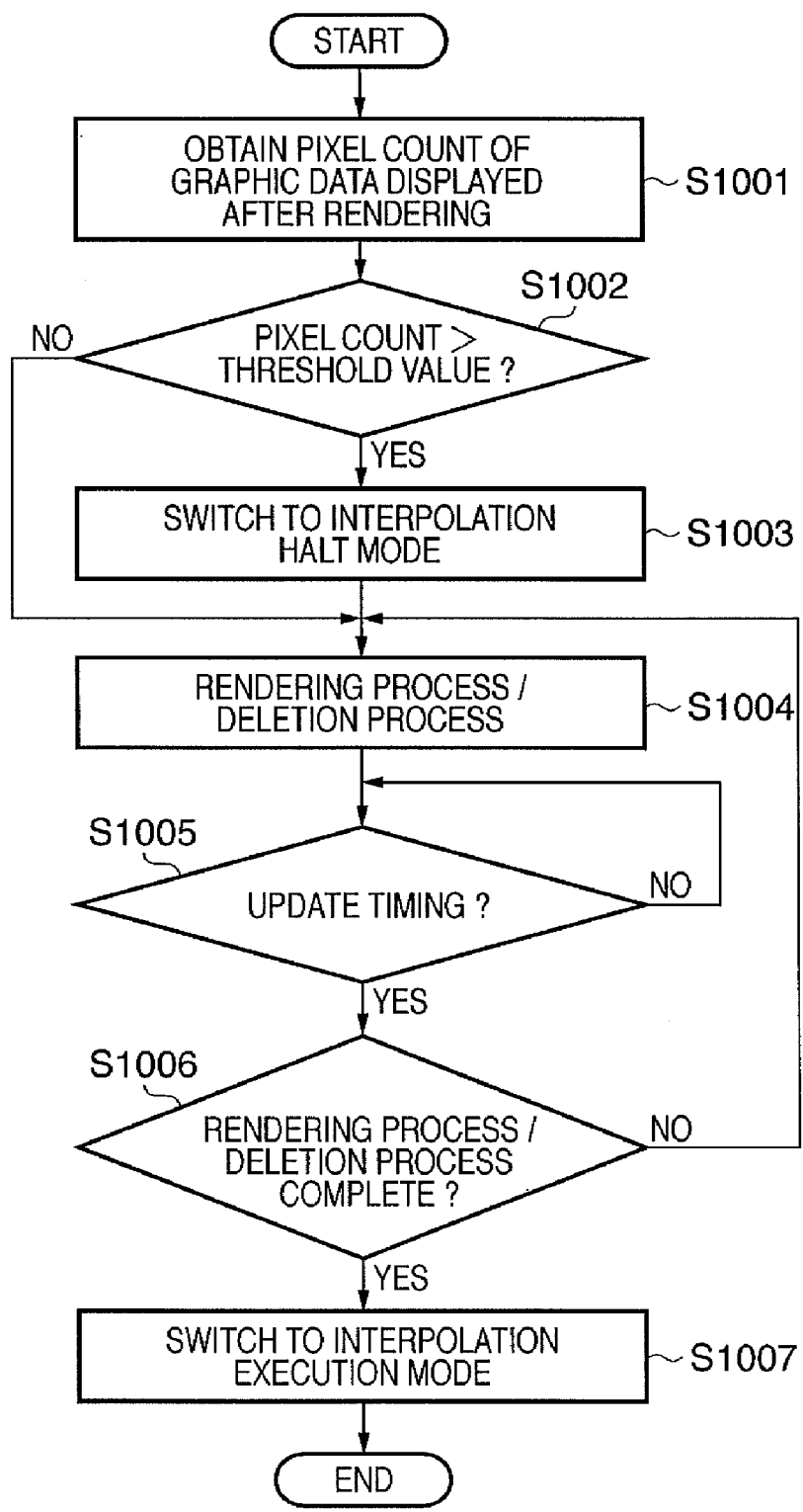
FIG. 8 is a flow chart illustrating the flow of processing in one aspect of the first embodiment.

It should be noted that, at the start of the flow chart illustrated in FIG. 8, the controller 123 is assumed to have been placed in a state (hereinafter referred to as the "Interpolation Execution Mode"), where it controls the interpolation frame generation circuit 122 to generate interpolation frame data.

In S1001, the rendering processor 100 computes the pixel count of the image data (graphic data) being rendered. For instance, if a rectangular image is rendered, the pixel count of the image data can be obtained by multiplying the number of pixels along a vertical side by the number of pixels along a horizontal side.

In S1002, the rendering processor 100 compares the pixel count computed in S1001 with a preset threshold value stored in the DRAM 101, etc. If the pixel count is greater than the threshold value, control proceeds to S1003, and if not, S1003 is skipped and control passes to S1004.

In S1003, the rendering processor 100 changes the status of the controller 123 to a state (hereinafter referred to as the "Interpolation Halt Mode"), where it controls the interpolation frame generation circuit 122 to halt the generation of interpolation frame data. In the Interpolation Halt Mode, the controller 123 controls the output circuit 124 to repeatedly read out the data of the original frames from the DRAM 101. The changeover of the control schemes is carried out during a blanking interval in synchronism with the vertical synchronizing signal.

If the pixel count computed in S1001 is not greater than the threshold value, S1003 is skipped, as a result of which the status of the controller 123 remains in the Interpolation Execution Mode.

In S1004, the rendering processor 100 renders the image data and the compositing circuit 121 composites the image data with the frame data of the video data. Moreover, if there are any already-rendered image data, the rendering processor 100 deletes such image data.

If the image data represent an animation image, the rendering processor 100 repeats the rendering of the image data at predetermined intervals. The timer 131 notifies the rendering processor 100 of interrupts by way of the interrupt controller 130 with a predetermined periodicity. For instance, if the period is $\frac{1}{15}$ seconds, the rendering processor 100 can render an animation image at 15 fps.

In S1005, the rendering processor 100 decides whether an interrupt notification has been received from the timer 131 and advances to S1006 if such a notification has been received.

In S1006, the rendering processor 100 determines whether to terminate the process of rendering. If it does not terminate it (for instance, if there still are images to be rendered during the rendering of animation images), control returns to S1004 and the same processing is repeated. If it terminates the process of rendering, control advances to S1007.

In S1007, the rendering processor 100 changes the status of the controller 123 to the Interpolation Execution Mode. It is necessary to wait for two vertical synchronizing signals to occur before the generation of interpolation frame data can be restarted because the data of the latest frame and the data of the preceding frame are required for the interpolation frame data generation process. The controller 123 changes the control scheme of the interpolation frame generation circuit 122 and output circuit 124 with reference to the vertical synchronizing signal.

It should be noted that if the threshold value is zero in S1002, then the above-described embodiment (the embodiment where the generation of interpolation frame data is halted when the image data is rendered) is obtained.

The present embodiment is also applicable in the following cases.

When JPEG still images are displayed on the display unit, the system decodes JPEG-compressed data and renders the resultant data. It is desirable for the rendering processor 100 to have a high processing capability because the higher the capability of the rendering processor 100, the shorter the JPEG decoding and rendering time can be made.

On the other hand, since the displayed data are still images, even if the interpolation frame data is generated, the resultant images are equivalent to those obtained by the frame doubling process. In such a case, halting the generation of interpolation frame data and increasing the transmission bandwidth of the DRAM 101 that can be used by the rendering processor 100 makes it possible to shorten the time necessary for JPEG decoding and still image display.

As explained above, in accordance with the present embodiment, when the rendering processor 100 renders image data, the controller 123 halts the generation of interpolation frame data by the interpolation frame generation circuit 122.

This suppresses the occurrence of situations where generation of image data representing high-quality images is impossible due to a lack of transmission bandwidth because the transmission bandwidth of the DRAM 101 that can be used by the rendering processor 100 is increased.

Moreover, in accordance with another aspect of the present embodiment, when the rendering processor 100 renders image data and when the pixel count of the image data is not less than a threshold value, the controller 123 halts the generation of interpolation frame data by the interpolation frame generation circuit 122.

As a result, when the rendering processor 100 does not require a lot of transmission bandwidth, the decrease in the image quality of the video data associated with halting the generation of interpolation frame data is suppressed.

Second Embodiment

The image processing apparatus 10 according to the first embodiment completely stopped the generation of interpolation frame data when predetermined conditions were met.

Incidentally, menu screens and other composite images are often represented by still images or by animation images having a low frame rate. In such cases, generating interpolation frame data corresponding to the composite image areas in the original frames does not particularly improve the image quality of the composite images. This is due to the fact that, in many cases, the composite images do not change between the two original frames, on which the generation of interpolation frame data is based.

Accordingly, in the second embodiment, when the rendering processor 100 generates image data, the generation of interpolation frame data is halted only in those areas of the original frames where image data is composited. In areas other than those areas, the generation of interpolation frame data continues.

This decreases the transmission bandwidth of the DRAM 101 consumed by the interpolation frame generation circuit 122 and allows the rendering processor to use correspondingly more transmission bandwidth. Furthermore, since the interpolation frame data is generated in areas other than the areas where the image data is composited, the image quality of the video data obtained when the rendering processor 100 generates the image data is improved.

Figure 9:
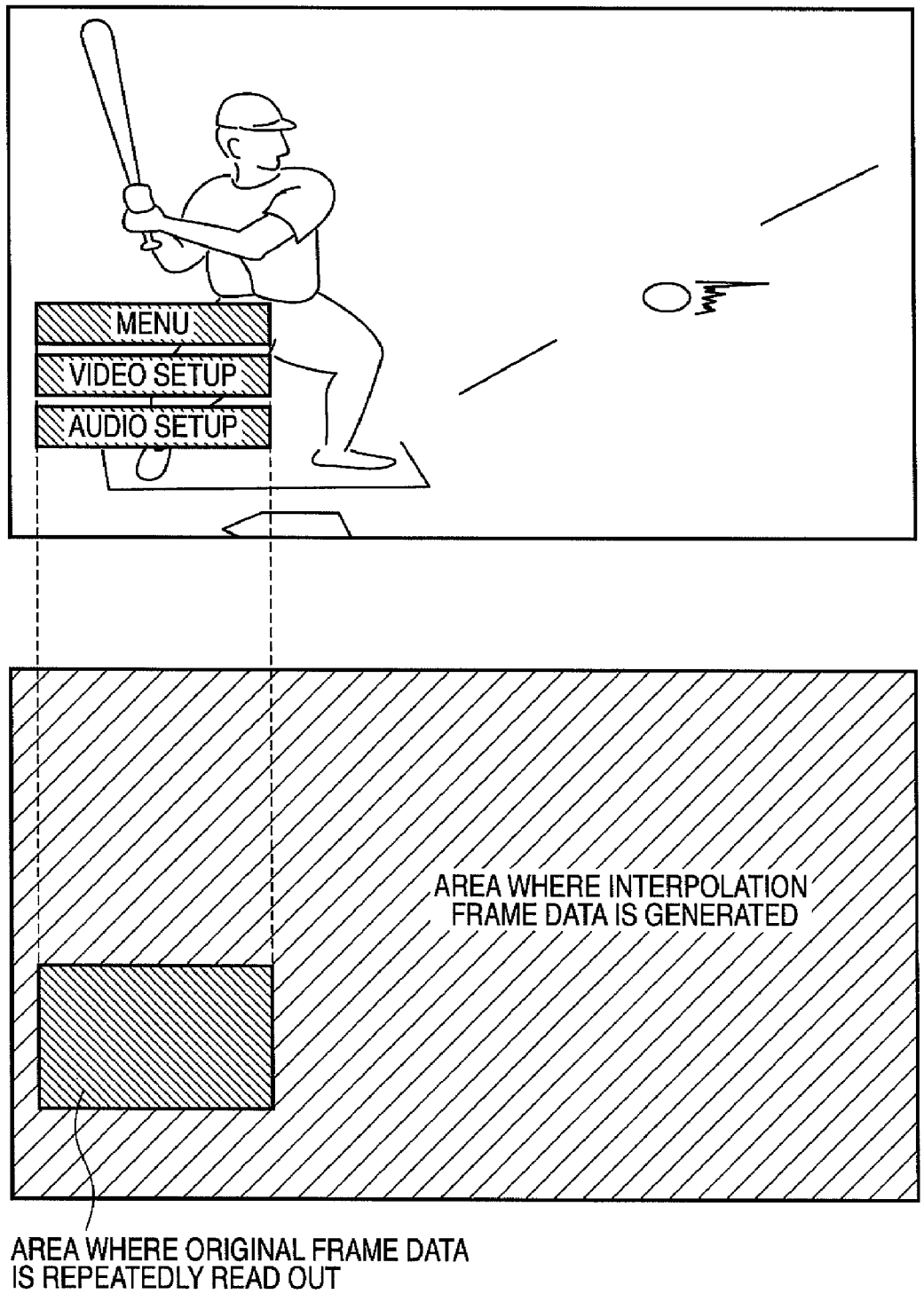
FIG. 9 is a conceptual diagram of a second embodiment.

FIG. 9 is a conceptual diagram of the second embodiment. In FIG. 9, a menu screen is displayed in the bottom left corner of the video image. In this case, in the area corresponding to the menu screen, the frame rate is accelerated by repeatedly reading out the data of the original frames. In areas outside of this area, the frame rate is accelerated by generating interpolation frame data and successively reading out the original frame data and interpolation frame data.

Figure 10:
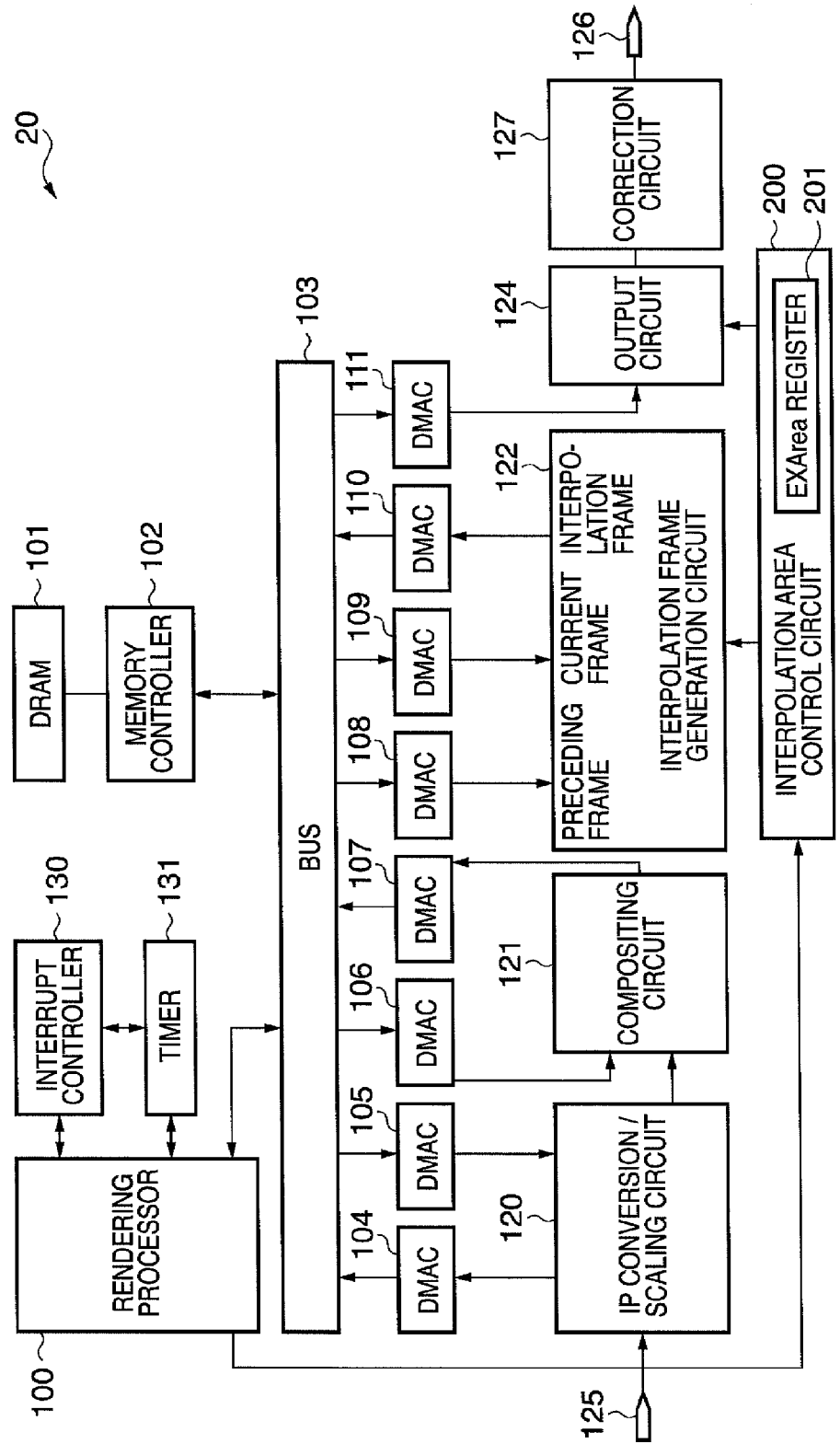
FIG. 10 is a diagram illustrating the configuration of an image processing apparatus according to the second embodiment.

FIG. 10 is a diagram illustrating the configuration of an image processing apparatus 20 according to the second embodiment. In FIG. 10, the same symbols are assigned to the same structural elements as in the image processing apparatus 10 according to the first embodiment and their explanation is omitted.

The reference numeral 200 designates an interpolation area control circuit that includes an EXArea register 201. The rendering processor 100 computes the areas in the frame data where the image data is composited and stores information describing the areas in the EXArea register 201. Based on the information stored in the EXArea register 201, the interpolation area control circuit 200 sets up pointers to processing areas used for generating interpolation frame data in the interpolation frame generation circuit 122 and DMACs 108, 109, and 110. Furthermore, pointers to data read out by the output circuit 124 are set up in the output circuit 124 and DMAC 111.

The DRAM 101 contains original frame data written via the DMAC 107 and interpolation frame data generated by the interpolation frame generation circuit 122. The output circuit 124 can select data to be read out according to the image areas under the control of the interpolation area control circuit 200.

Figure 11:
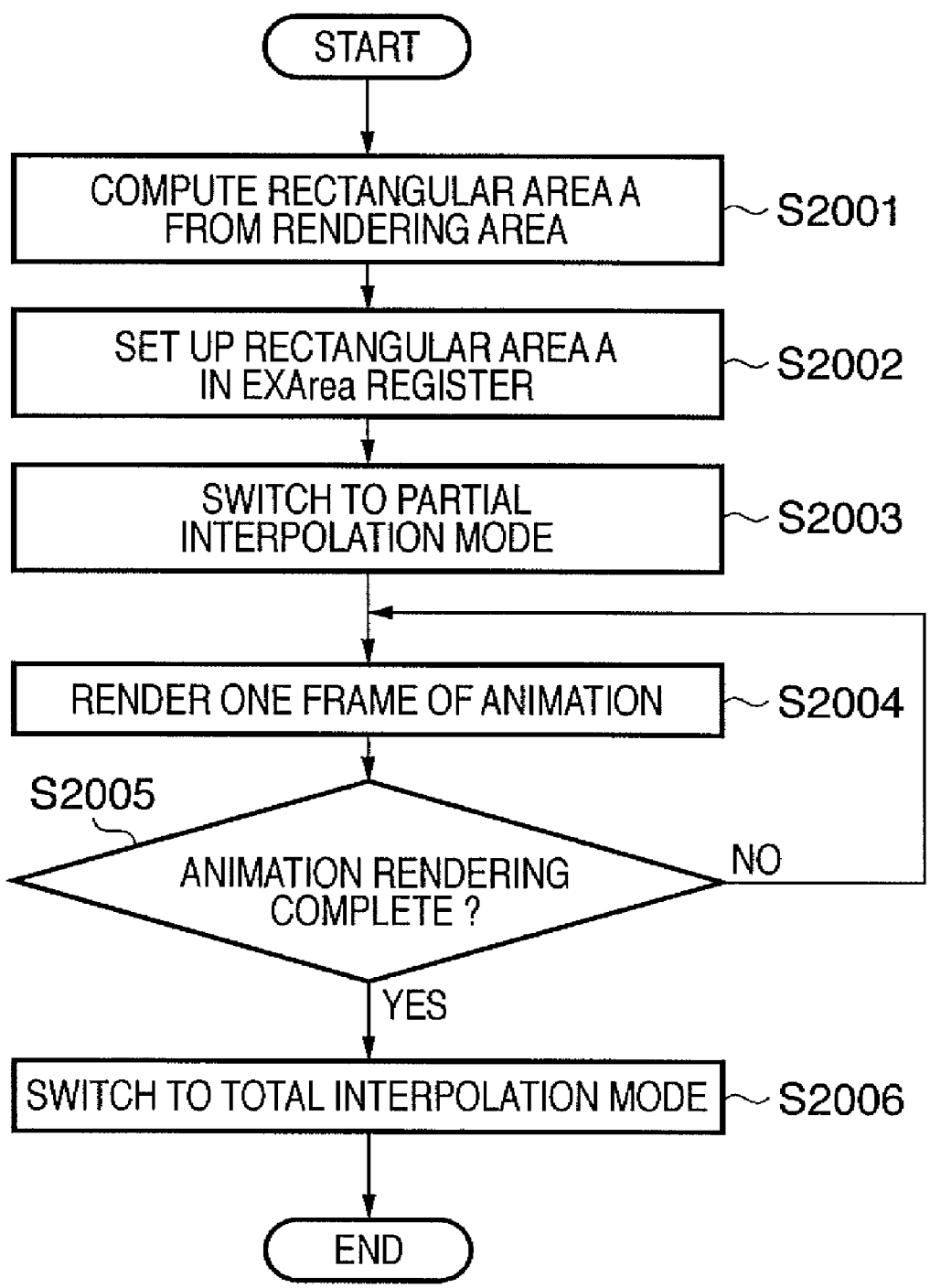
FIG. 11 is a flow chart illustrating the flow of processing in the second embodiment.

FIG. 11 is a flow chart illustrating the flow of processing in the second embodiment. The processing of this flow chart starts when the rendering processor 100 initiates image data generation.

It should be noted that, at the start of the flow chart shown in FIG. 11, the interpolation area control circuit 200 is assumed to have been placed in a state (hereinafter referred to as the "Total Interpolation Mode"), where it controls the interpolation frame generation circuit 122 to generate interpolation frame data for the entire area of the frame.

In S2001, the rendering processor 100 computes the coordinates of the areas (compositing areas) where the rendered image data is composited.

In S2002, the rendering processor 100 sets up the coordinates computed in S2001 in the EXArea register 201.

In S2003, the rendering processor 100 changes the status of the interpolation area control circuit 200 to a state (hereinafter referred to as the "Partial Interpolation Mode"), in which it controls the interpolation frame generation circuit 122 to generate interpolation frame data only for areas other than the compositing areas. In the Partial Interpolation Mode, the interpolation area control circuit 200 controls the output circuit 124 to repeatedly read out the data of the original frames for the compositing areas from the DRAM 101.

In S2004 and S2005, the rendering processor 100 carries out image data rendering until the animation terminates. The processing involved herein is the same as in the steps S1004 through S1006 of FIG. 8 and their detailed explanation is therefore omitted.

In S2006, the rendering processor 100 changes the status of the interpolation area control circuit 200 to the Total Interpolation Mode. At such time, the interpolation area control circuit 200 first initiates the generation of interpolation frame data for the entire area by sending an instruction to the interpolation frame generation circuit 122. Upon generation of interpolation frame data, an instruction is sent to the output circuit 124. At this point in time, the output circuit 124 initiates the readout of the interpolation frame data for the entire area.

Figure 12:
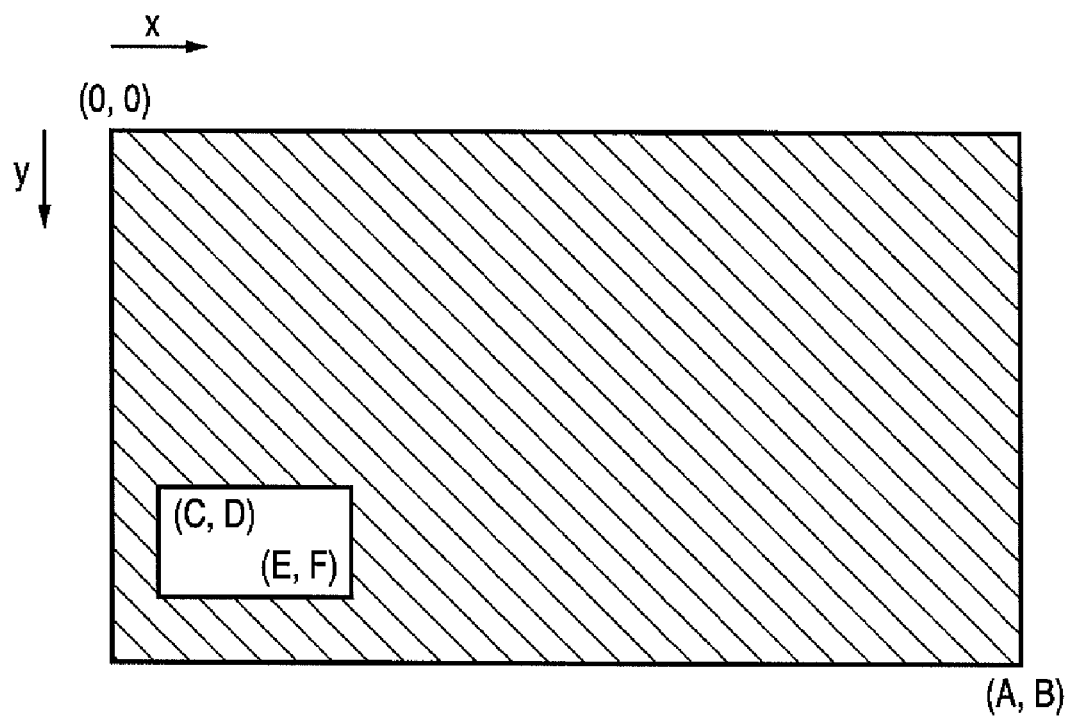
FIG. 12 is a diagram illustrating coordinates used to specify areas within frames in the second embodiment.

FIG. 12 is a diagram illustrating coordinates used to specify areas within frames. The frame (video image) displayed by the display unit is the area designated by the coordinates (0,0) and (A,B).

The area (compositing area) where the image data is composited is a rectangular area designated by (C,D) and (E,F). In the compositing areas, the process of frame rate conversion is carried out based on the frame doubling scheme, whereas in other areas within the frames the process of frame rate conversion is carried out based on the interpolation frame generation scheme.

As a result of the processing illustrated in S2002 and S2003 of FIG. 11, an area, in which the frame doubling scheme is employed as the frame rate conversion scheme, is set up by the rendering processor 100 in the EXArea register 201. For instance, in FIG. 12, the settings used in the register are (C,D) and (E,F).

The DMACs 108, 109, and 110 do not perform data transmission for the area defined by the coordinates set up in the EXArea register 201 and perform data transmission only for other areas.

Accordingly, the interpolation frame data generation process is not carried out in the area defined in the EXArea register 201 and no memory access associated with this area takes place either.

At the same time, by referring to the EXArea register, the output circuit 124 determines the image data to be read out. The DRAM 101 contains the image data (original frame data) written to the DMAC 107.

Moreover, the interpolation frame data generated by the interpolation frame generation circuit 122 and DMAC 110 is also recorded in the DRAM 101. However, there are no such data for the area specified in the EXArea register 201.

Figure 13:
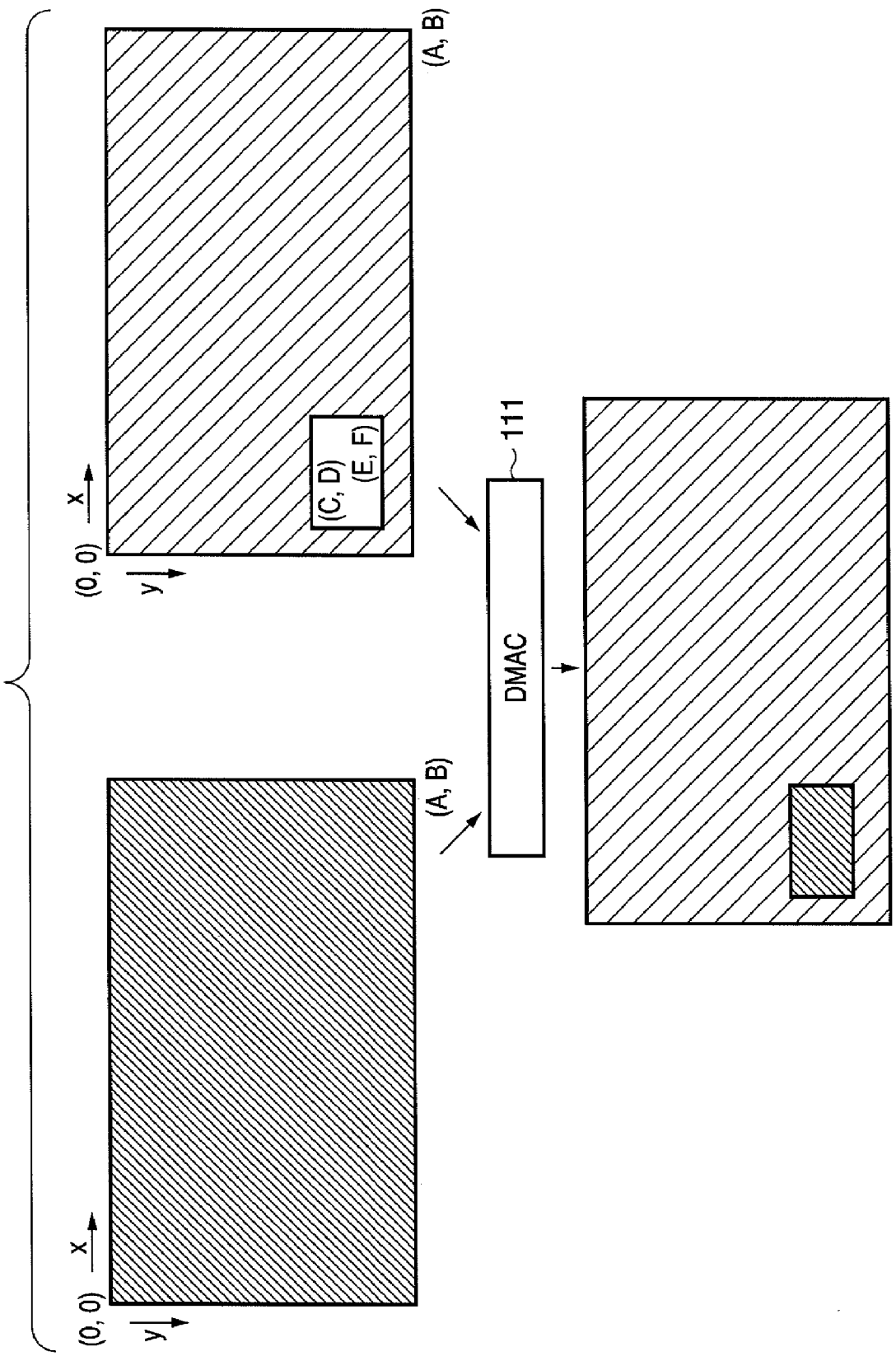
FIG. 13 is a diagram illustrating readout of data from the DRAM by the output circuit in the second embodiment.

The DMAC 111 reads out the original frame data and interpolation frame data in alternate order, for example, every $1/120$ seconds. However, as far as the interpolation frame data is concerned, the interpolation frame data is read out only for areas other than the area, in which data produced by the interpolation frame data generation process is present, i.e. other than the area specified in the EXArea register 201. The original frame data is read out in all other areas, i.e. in the areas specified in the EXArea register 201 (see FIG. 13).

For instance, the output circuit 124 doubles the rate of, for example, 60-fps video data to 120 fps by outputting the original frame data and interpolation frame data in alternate order. However, as a result of the above-described processing, when the interpolation frame data is output, the above-mentioned original frame data is read out and output for the area defined by the coordinates set up in the EXArea register 201 and the interpolation frame data is output for the other areas.

Explanations will be now provided regarding the state of memory bandwidth and the operation of the rendering processor 100 during the above-described operation.

Figure 14:
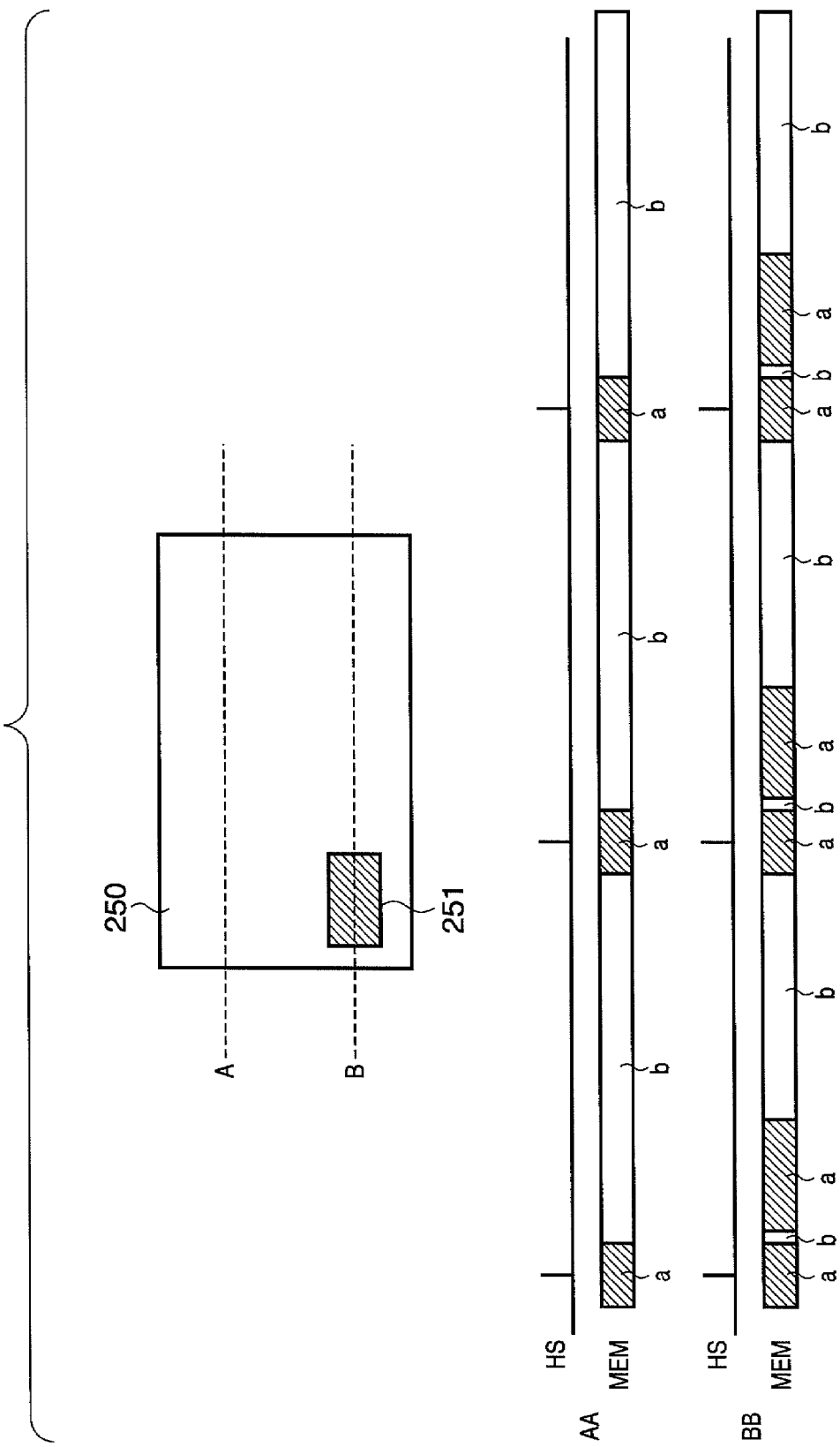
FIG. 14 is a diagram explaining the state of memory bandwidth and the operation of the rendering processor in the second embodiment.

In FIG. 14, in the portion indicated by the reference numeral 250, frame rate conversion is carried out based on the interpolation frame generation scheme. In the portion indicated by the reference numeral 251, no interpolation frame generation is carried out and no memory access necessitated thereby takes place either. Therefore, this is a period, during which the rendering processor 100 can use more transmission bandwidth in the DRAM 101.

Memory access at the position designated as "A" on the screen is designated as "AA" and memory access at the position designated as "B" on the screen is designated as "BB". "HS" designates a horizontal synchronizing signal and "MEM" designates memory access.

In "AA" and "BB", "b" designates periods, where memory access occurs during the interpolation frame generation process, and "a" designates periods, where it does not occur, i.e. during which the rendering processor can access the memory.

The number of periods "a", i.e. periods, during which no memory access takes place, increases along the line designated as "B" because no memory access occurs in the area 251. This improves the memory access capability of the rendering processor 100 and improves the performance of the rendering processor 100. The wider the area designated as 251, the longer the time during which the rendering processor 100 can use more transmission bandwidth.

The present embodiment is also applicable in the following cases.

Figure 15:
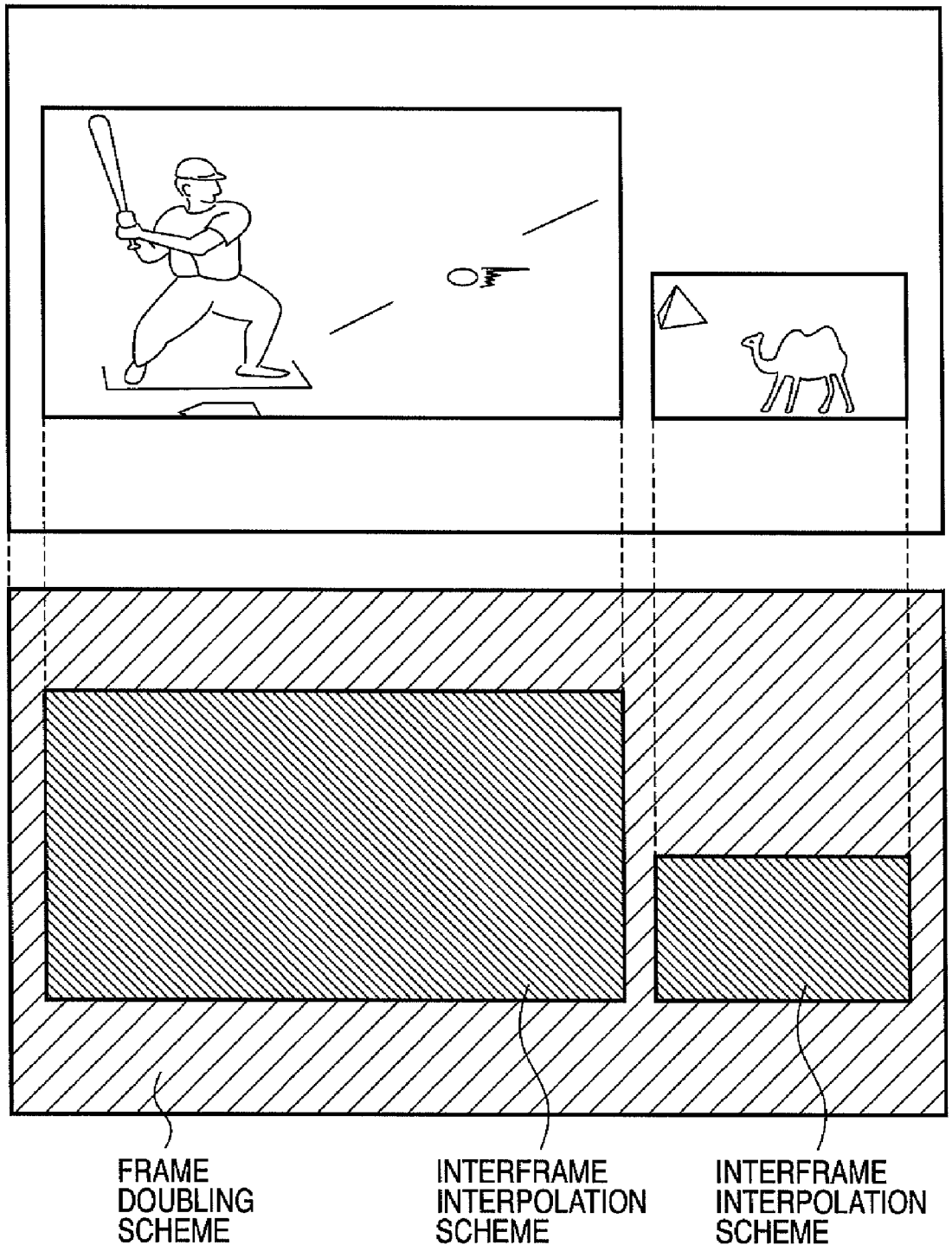
FIG. 15 is conceptual diagram illustrating another aspect of the second embodiment.

TV sets are sometimes provided with functionality permitting display of two screens on a single display unit. In such a case, as shown in FIG. 15, there will be areas displaying video images and other areas. Since no moving pictures are supposed to be displayed in those other areas, there is no need to perform the generation of interpolation frame data. Therefore, in this portion, the interpolation frame generation process can be halted.

Accordingly, the transmission bandwidth consumed by the interpolation frame generation circuit 122 is reduced and the rendering processor 100 can use correspondingly more transmission bandwidth. High-definition animation images and other images of higher quality can be rendered as a result.

In a similar manner, during receipt of a data broadcast, the process of frame rate conversion in the portion used to display the data broadcast can be carried out based on the frame doubling scheme.

As explained above, in accordance with the present embodiment, even if the rendering processor 100 generates image data, interpolation frame data is still generated for areas other than the areas where the image data is composited.

This improves the image quality of the video data obtained when the rendering processor 100 generates image data.

Third Embodiment

In a third embodiment, each portion of image data has a blending coefficient "α". The blending coefficient "α" is a parameter that indicates the degree of transparency obtained when compositing image data with video images, in such a manner that the smaller the "α" is, the higher the degree of transparency of the image data becomes. In the present embodiment, interpolation frame data used for the compositing area is generated when the "α" is not more than a threshold value, i.e. when the image data is composited such that the degree of transparency is equal to, or greater than, a predetermined degree. Conversely, no interpolation frame data is generated when the "α" is more than the threshold value, with the frame rate of the compositing area accelerated based on the frame doubling scheme. Alternatively, priority is given to image data with a larger "α" (a low degree of transparency) and the frame doubling scheme is used as the frame rate conversion scheme in the compositing areas.

If the blending coefficient "α" of the image data images is small when the images are composited, video images will be seen behind the image data. If the frame rate conversion scheme of the rendering area is switched from the interpolation frame generation scheme to the frame doubling scheme in this state, situations may arise, in which a difference in quality due to different frame rate conversion schemes will be perceptible in the rendering areas.

On the other hand, since it would be advantageous to improve rendering performance, if possible, it is desirable to adopt the frame doubling scheme as the frame rate conversion scheme for the areas that are subject to rendering (compositing areas).

In case of high-transmittance image data, the viewer will easily see the video images on which the image data is superimposed. Therefore, the higher the transmittance of the image data, the higher the quality of processing that needs to be performed for frame rate conversion. The present embodiment is based on this realization.

Figure 16:
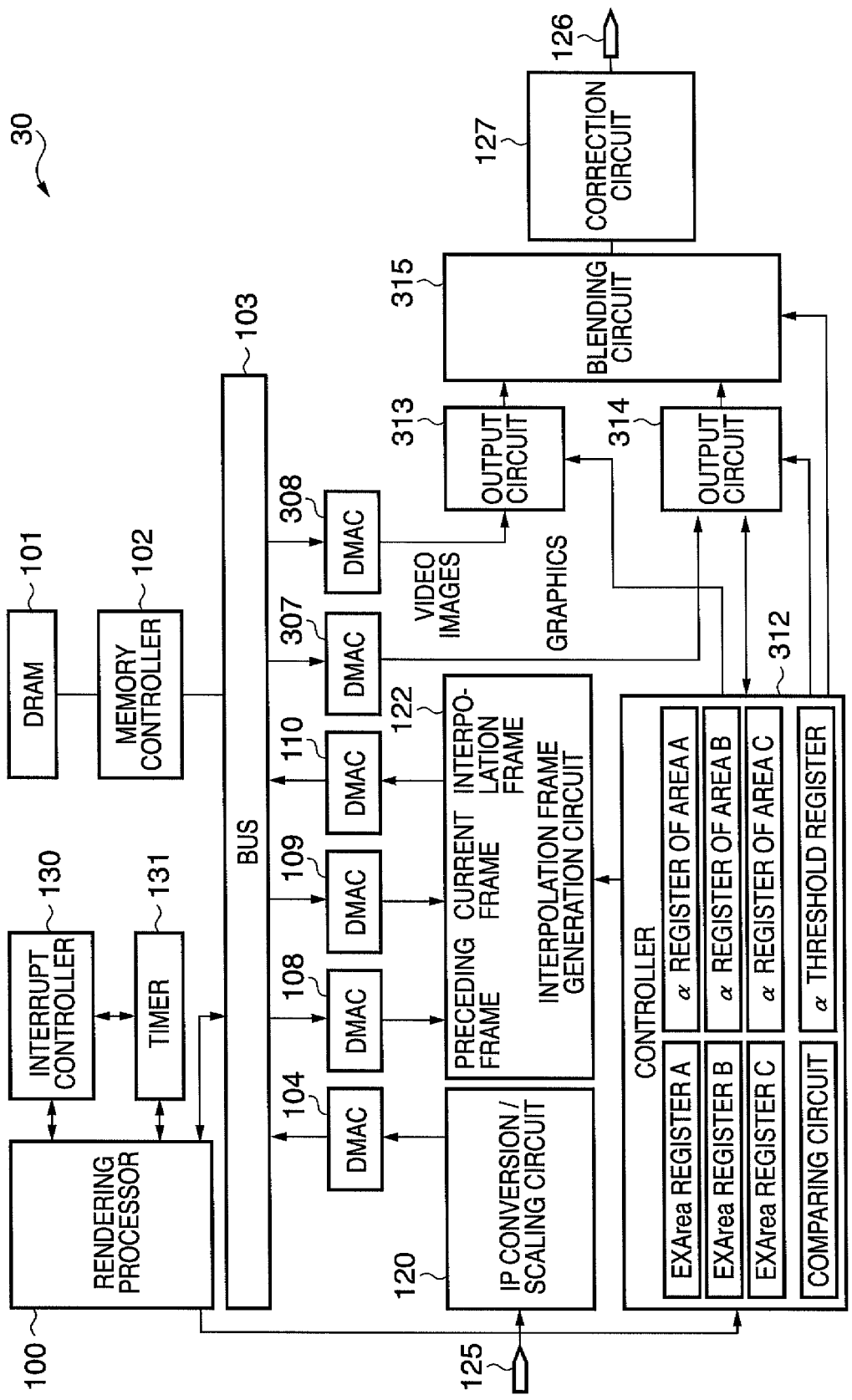
FIG. 16 is a diagram illustrating the configuration of an image processing apparatus according to a third embodiment.

FIG. 16 is a diagram illustrating the configuration of an image processing apparatus 30 according to the third embodiment. In FIG. 16, the same symbols are assigned to the same structural elements as in the image processing apparatus 10 and their explanation is omitted.

By controlling the DMAC 308, the output circuit 313 reads out video data contained in the DRAM 101 and outputs it to a blending circuit 315. The output circuit 313 outputs 120-fps video data by reading out the original frames and interpolation frames in alternate order at a double rate. Here, the original frames are repeatedly read out for those areas, in which no interpolation frames are generated.

By controlling the DMAC 307, the output circuit 314 reads out the image data rendered by the rendering processor 100 in the DRAM 101 and outputs it to the blending circuit 315. At such time, the data rate is 120 fps, with the output circuit 314 operating in synchronism with the output circuit 313.

Under the control of the controller 312, the blending circuit 315 blends the video data provided as input from the output circuit 314 and image data provided as input from the output circuit 313 in accordance with the value of the blending coefficient "α". The ratio of the video data during blending is proportional to the "α". For instance, when the "α"=0, compositing is carried out using 100% video image output and 0% image data and when the "α"=0.3, compositing is carried out using 70% video image output and 30% image data.

Signals indicating the value of the "α" and the compositing areas are output from the controller 312. The blending circuit 315 uses them for blending in accordance with the value of the "α", which varies depending on the compositing area.

The controller 312 controls the interpolation frame generation circuit 122, output circuit 313, output circuit 314, and blending circuit 315. The controller 312 includes registers used for specifying areas, i.e. EXArea register A, EXArea register B, and EXArea register C. Moreover, it includes an "α" register for Area A, an "α" register for Area B, and an "α" register for Area C, which are used for storing the blending coefficients "α" corresponding to the respective areas. In addition, it also includes a background "α" register (not shown). Furthermore, the controller 312 includes an "α" threshold register, which is a register used to store the threshold value of "α" used in controlling the interpolation frame generation circuit 122. Furthermore, the controller 312 has a comparing circuit, which it uses to compare the "α" values of each portion of the image data with the threshold value.

Figure 17:
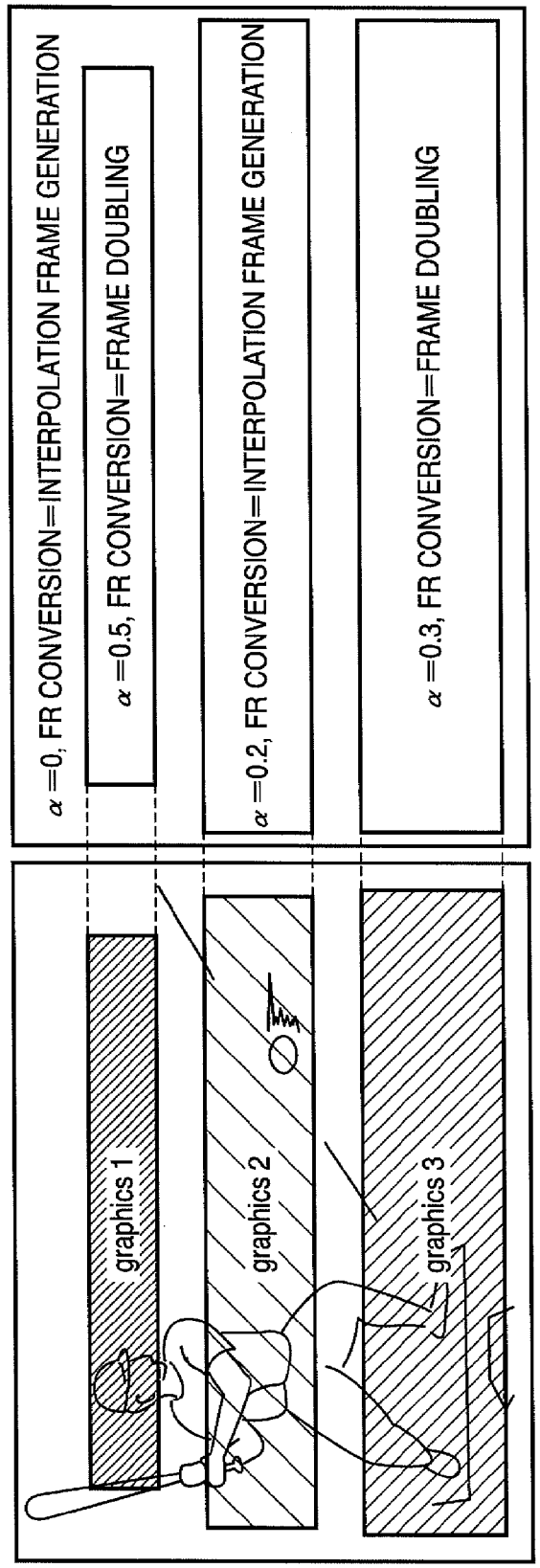
FIG. 17 is a diagram illustrating an example of video data display according to the third embodiment.

FIG. 17 is a diagram illustrating an example of video data display according to the third embodiment. The respective degrees of transparency of the composited image data vary. When the degree of transparency is low (when the "α" is large), generation of interpolation frame data for the compositing area does not particularly contribute to image quality improvements because the visibility of the images of the original frames is low. Accordingly, the generation of interpolation frame data is halted.

Figure 18:
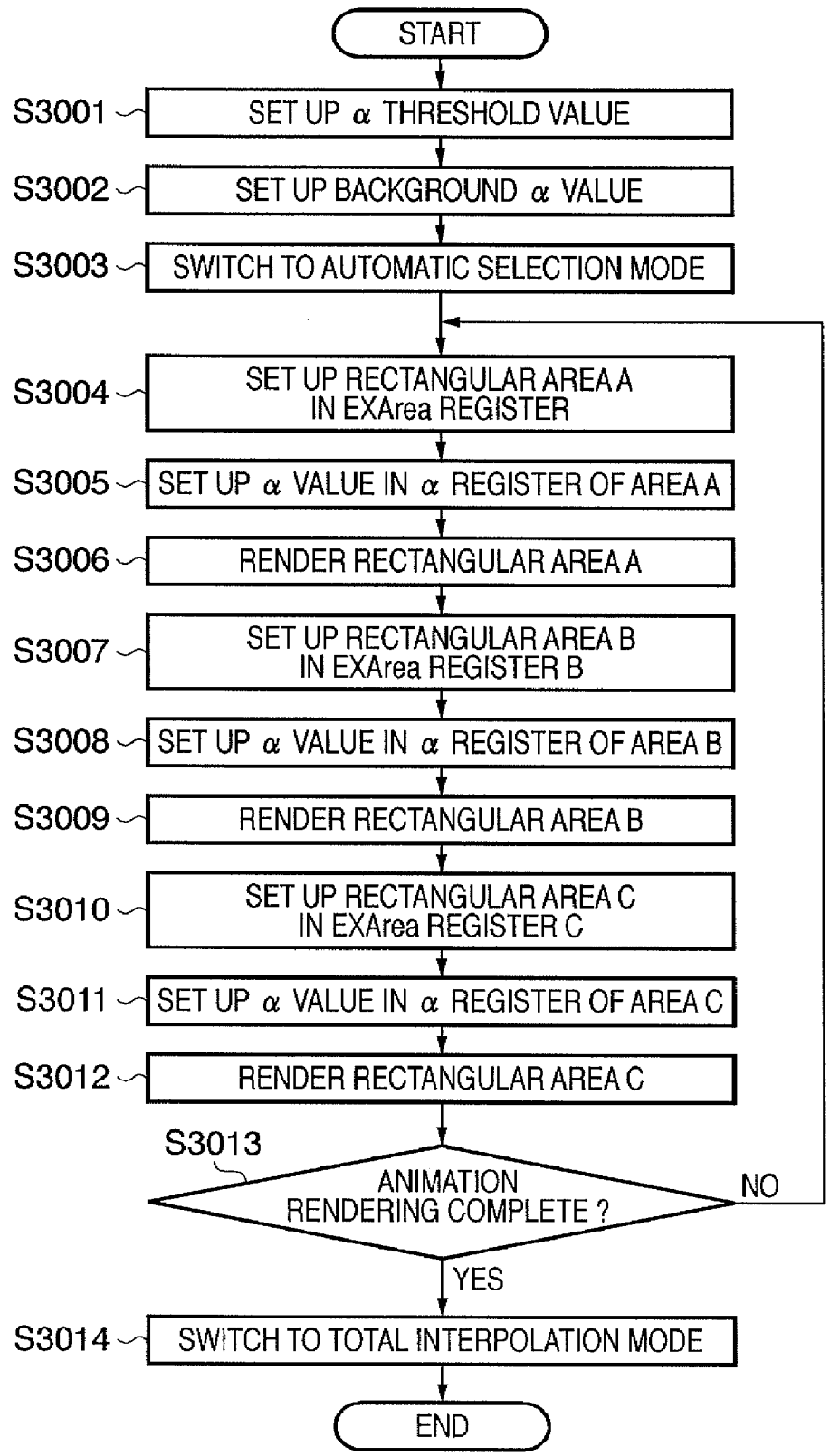
FIG. 18 is a flow chart illustrating the flow of processing in the third embodiment.

FIG. 18 is a flow chart illustrating the flow of processing in the third embodiment. The processing of this flow chart starts when the rendering processor 100 receives an instruction to render image data.

It should be noted that, at the start of the flow chart illustrated in FIG. 18, the controller 312 is assumed to have been set to the Total Interpolation Mode.

In S3001, the rendering processor 100 sets up the threshold value of the "α" in the "α" threshold register provided in the controller 312. This value is a reference value used in determining the "α" of areas set up thereafter.

In S3002, the rendering processor 100 sets up an "α" value for the background in the background "α" register. This value is a coefficient used when blending video images with image data outside of the areas specified by the rectangular areas serving as the rendering areas.

In S3003, the rendering processor 100 switches the controller 312 to the Automatic Selection Mode. In the Automatic Selection Mode, as described above, the interpolation frame generation circuit 122 halts the generation of interpolation frame data in those areas, in which the transparency of the image data is less than a predetermined degree. Instead of using interpolation frame data, the output circuit 313 then repeatedly reads out original frame data for those areas, in which no interpolation frame data is produced.

In S3004, the rendering processor 100 sets up the coordinates of the rectangular area A in the EXArea register A.

In S3005, a blending coefficient "α", which is applied to image data rendered in the rectangular area A, is set up in the "α" register of Area A by the rendering processor 100.

At this point in time, the controller 312 compares the "α" value set up in the "α" register of Area A with the value set up in the "α" threshold register. If the "α" value of the register of Area A is greater than the threshold value (if the transparency is less than a predetermined degree), the frame rate conversion scheme of Area A is switched to the frame doubling scheme.

In S3006, the rendering processor 100 renders (generates) the image data of the rectangular area A.

In S3007 through S3012, the same type of processing is performed on the rectangular area B and rectangular area C.

When the rendering of the image data terminates, control passes from S3013 to S3014 and the rendering processor 100 switches the controller 312 to the Total Interpolation Mode.

Explanations will be now provided with respect to the processing of the background. As used herein, the term "background" refers to areas other than the areas designated as Area A, Area B, and Area C. The controller 312 determines the value of the "α" for the background. The "α" value set up in the background "α" register is compared with the value set up in the "α" threshold register. If the "α" value is not less than the reference value, the frame rate conversion scheme used for the background is changed to the frame doubling scheme. In other words, the interpolation frame generation circuit is controlled to halt the generation of interpolation frames for the background and the output circuit 313 is controlled such that, for background-related output image, each original frame is output repeatedly, twice.

As explained above, in accordance with the present embodiment, even in the areas where the image data is composited, the generation of interpolation frame data is still carried out in these compositing areas if the degree of transparency is not less than a predetermined degree.

This improves the image quality of video data obtained when the rendering processor 100 generates image data.

Fourth Embodiment

Figure 19:
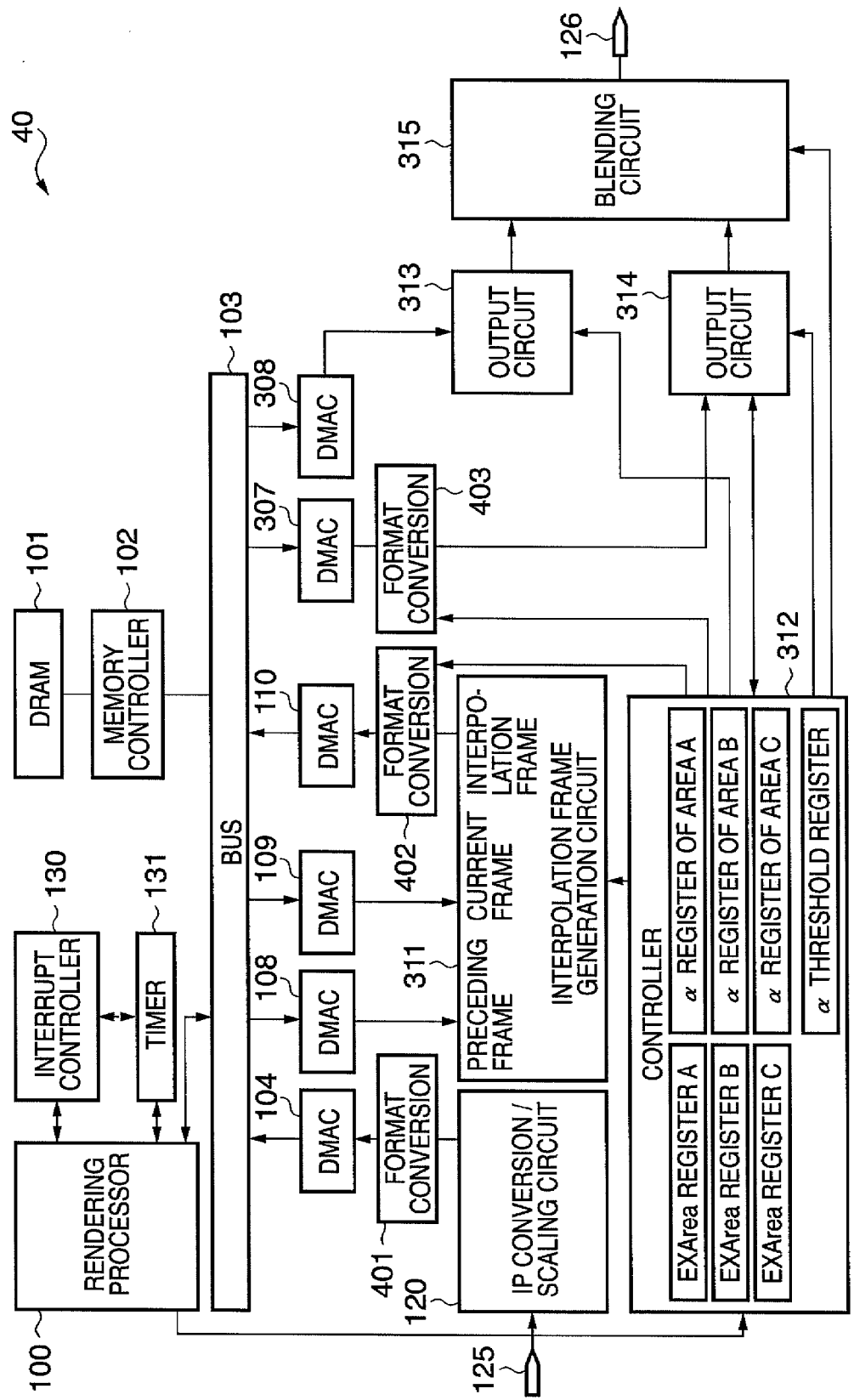
FIG. 19 is a diagram illustrating the configuration of an image processing apparatus according to a fourth embodiment.

FIG. 19 is a diagram illustrating the configuration of an image processing apparatus 40 according to a fourth embodiment. In comparison with the image processing apparatus 30, the image processing apparatus 40 is configured with additional format conversion circuits 401 through 403.

The format conversion circuits 401 and 402 have two modes of operation. One of the modes is a "Pass-through Mode", in which input video data is output "as is". The other mode is a "Data Volume Reduction Mode", in which the data volume of input signals is reduced.

In the Data Volume Reduction Mode, 16-bit YCbCr 4:4:4 video data is converted to a 8-bit YCbCr 4:2:2 format. Therefore, the per-pixel data volume can be reduced from 48 bits to 16 bits.

Conversely, the format conversion circuit 403 is a circuit used to restore data formats converted by the format conversion circuits 401 and 402 to the original data formats.

In a similar manner, the format conversion circuit 403 also has two modes of operation. One mode is a "Pass-through Mode", in which inputs are output "as is", and the other mode is a "Restoration Mode", in which video data represented in 8-bit YCbCr 4:2:2 format is restored back to 16-bit YCbCr 4:4:4 format.

When the rendering processor 100 does not perform image data rendering, the mode of operation of the format conversion circuits 401, 402, and 403 is the Pass-through Mode.

On the other hand, when the rendering processor 100 performs image rendering, the controller 312 is instructed to change the frame rate conversion mode. In response, the controller 312 issues a command to the format conversion circuits 401, 402, and 403 to change the mode from the Pass-through Mode to the conversion mode (Data Volume Reduction Mode) or Restoration Mode.

As a result, the format of the data written by the IP conversion/scaling circuit 120 to the DRAM 101 is converted and the associated memory bandwidth of the DRAM 101 is reduced to ⅓ of its magnitude. In a similar manner, the memory bandwidth used for memory access associated with the interpolation frame data generation process is also reduced to ⅓ of its magnitude. The format conversion circuit 403 restores data transmitted by the DMAC 307 to the output circuit 314 to its original format.

Upon termination of rendering, the rendering processor 100 changes the mode of operation of the format conversion circuits 401, 402, and 403 back to the Pass-through Mode.

Such processing allows the image processing apparatus 40 to reduce the transmission bandwidth consumed by the interpolation frame data generation process and allocate a corresponding amount thereof to the rendering processor 100. As a result, the rendering processor 100 can render images of higher quality.

The present embodiment can be effectively used as a "different algorithm utilizing a smaller volume of data transmission to the DRAM 101", as explained in the first embodiment.

Fifth Embodiment

In a fifth embodiment, even when the rendering processor 100 generates image data, interpolation frame data is still generated if the volume of data that the rendering processor 100 transmits to, and receives from, the DRAM 101 does not exceed a predetermined threshold value.

Figure 20:
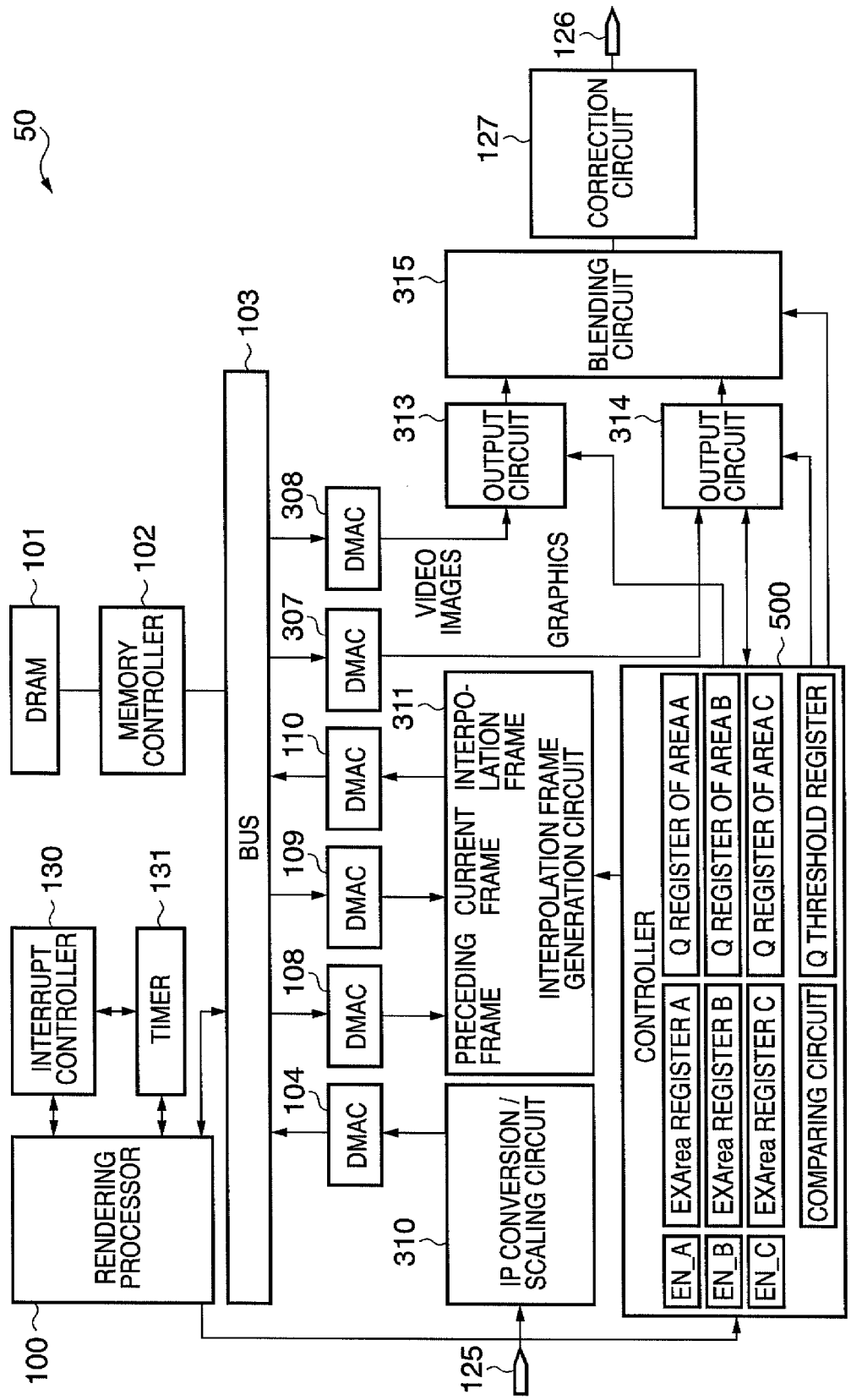
FIG. 20 is a diagram illustrating the configuration of an image processing apparatus according to a fifth embodiment.

FIG. 20 is a diagram illustrating the configuration of an image processing apparatus 50 according to the fifth embodiment.

The reference numeral 500 designates a controller, which includes an EXArea register A, an EXArea register B, and an EXArea register C used to specify the coordinates of Area A, Area B, and Area C as rendering areas (compositing areas). It also includes a Q register for Area A, a Q register for Area B, and a Q register for Area C, which are used to set up, in digital form, the volume of data transmission to/from the frame memory required in connection with rendering for the corresponding rendering areas. In addition, it includes a Q threshold register used to set up a threshold value, with which the values of the Q registers are compared, and a comparing circuit, which compares the values set up in the Q register of each area with the value of the Q threshold register.

The controller 500 includes registers used to decide whether to carry out automatic changes of frame rate conversion scheme for the respective areas. These include an EN (enable)_A register for Area A, an EN_B register for Area B, and an EN_C register for Area C.

The rest of the structural elements are identical to those of the third embodiment and their explanation is therefore omitted.

The volume of data transmission to the frame memory required in connection with rendering varies depending on the data characteristics of the rendered image data. For instance, in case of animation, the requisite data transmission capability increases because a higher frame rate requires a lot of memory access.

Moreover, if the rendering processor compresses data when storing data in memory, the requisite data transmission capability increases because of the increase in the volume of data transmitted to memory in case of data having a low compression ratio. In such a case, if we compare rendering gradient images with rendering solid-fill images, the requisite data transmission capability will be higher when rendering gradients.

In addition, when multiple data accesses of short burst length are carried out in a system designed for burst transmissions, a lot of overhead occurs between the data transmissions, thereby decreasing data transmission efficiency. In such a case, the number of required data transmissions to/from the frame memory has to be set to a higher number.

The image processing apparatus 50 determines the required volume of data transmissions to/from the frame memory for each rendering object in advance and represents it in digital form. It then stores it in a form suitable for writing it to a software program.

The operation of the rendering process will be now explained with reference to FIG. 21 and FIG. 22.

This exemplary embodiment is a system, in which multitasking is accomplished with the help of the operating system. Accordingly, explanations will be now provided regarding the respective tasks.

Figure 21:
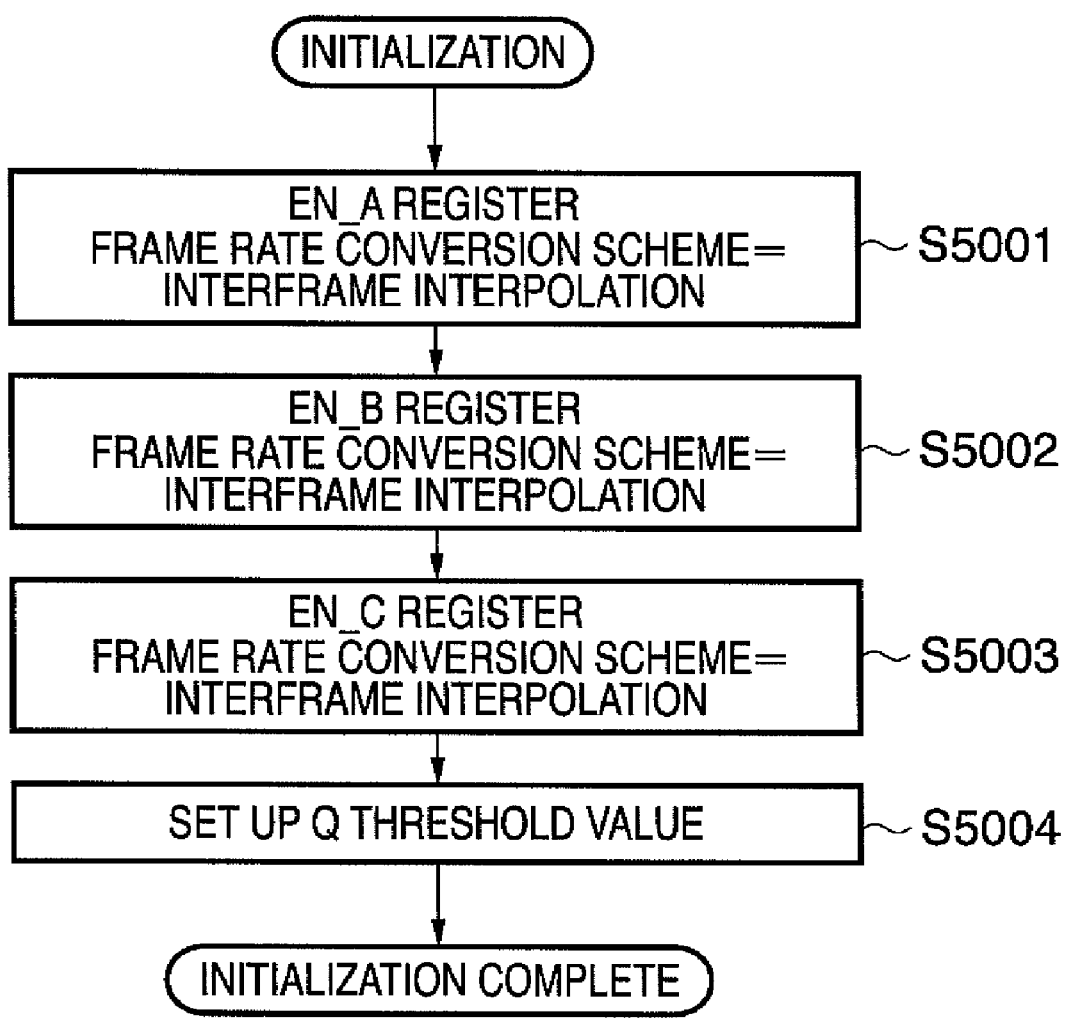
FIG. 21 is a flow chart illustrating the flow of initialization processing in the fifth embodiment.

FIG. 21 is a flow chart illustrating the flow of initialization processing.

A parameter indicating the interframe interpolation scheme is set up by the rendering processor 100 in the EN_A register in S5001, in the EN_B register in S5002, and in the EN_C register in S5003. As a result, at this point in time, the image processing apparatus 50 performs frame rate conversion in accordance with the interframe interpolation scheme.

Next, in S5004, the rendering processor 100 sets up a Q threshold value in the Q threshold register. The value of the Q threshold is a parameter configured in advance in the software program that carries out the process.

Figure 22:
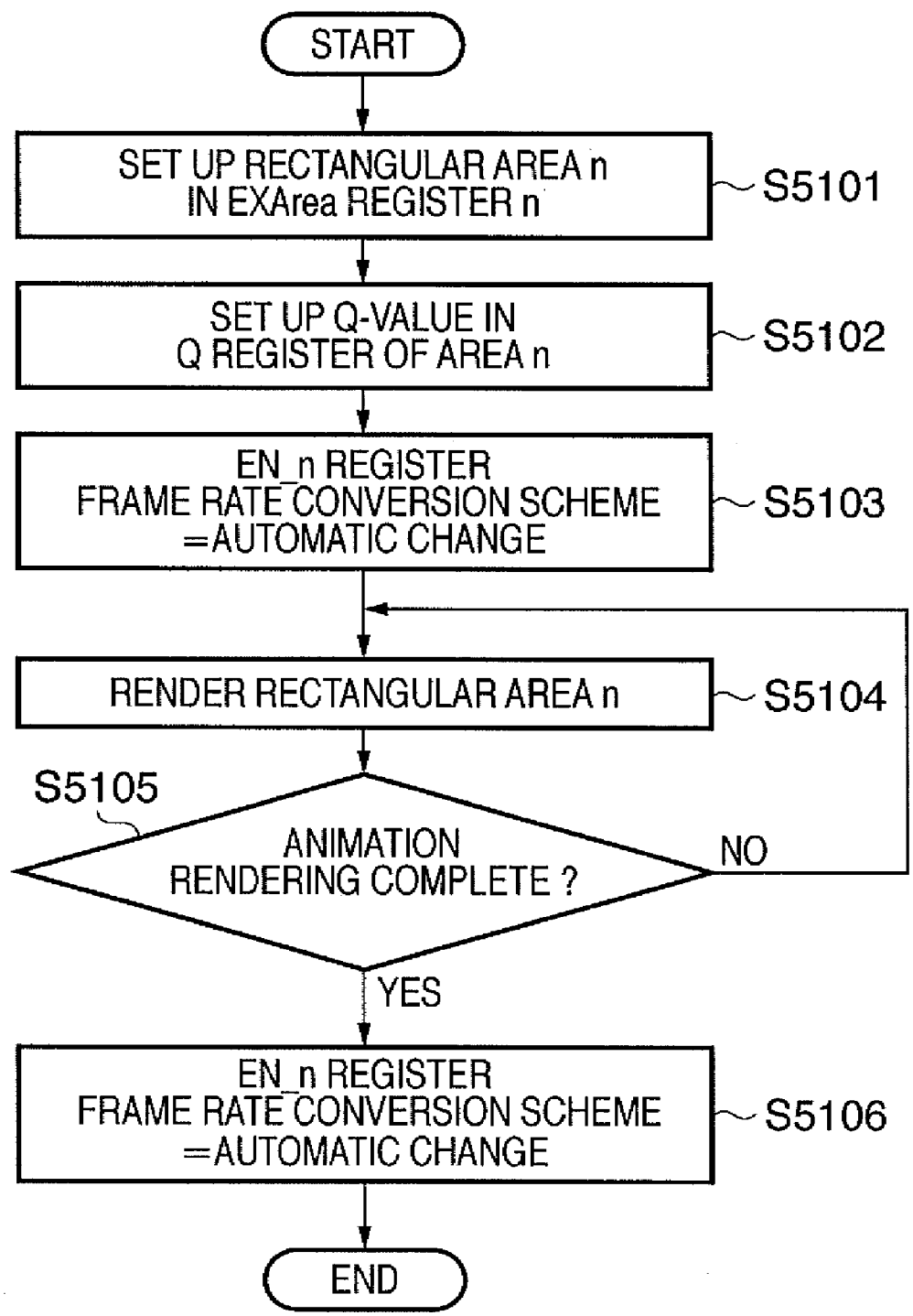
FIG. 22 is a flow chart illustrating the flow of processing that takes place when the rendering processor renders image data in the fifth embodiment.

FIG. 22 is a flow chart illustrating the flow of processing that takes place when the rendering processor 100 renders image data.

The rendering process, where n, for which any of the Areas A, B, C are substituted, coordinates indicating rendering areas, and Q-values associated with the areas are used as arguments, permits invocation in a re-entrant manner, which makes it possible for rendering processes in the respective areas to proceed simultaneously in a multi-tasking fashion.

The processing of this flow chart starts when the rendering process is invoked.

In S5101, the rendering processor 100 sets up a rectangular area n (n is a value given as an argument, which can be any one of A, B, or C) and the coordinates of the area corresponding to n in the EXArea register n (n is a value given as an argument, which can be any one of A, B, or C).

In S5102, the rendering processor 100 sets up a value obtained by representing the required volume of data transmission associated with the area in numerical form in the Q register of Area n (n is a value given as an argument, which can be any one of A, B, or C).

In S5103, the rendering processor 100 sets up a parameter designating automatic change as the frame rate conversion scheme in the EN_n register (n is a value given as an argument, which can be any one of A, B, or C)

At this point in time, the controller 500 compares the Q-values set up for the respective areas with the Q threshold value. Upon recognizing an area having a Q value higher than the Q threshold value, the interpolation frame generation circuit 311 and output circuit 314 are controlled to change the frame rate conversion scheme for this area to the frame doubling scheme.

In S5104, the rendering processor 100 initiates the process of rendering for Area n (n is a value given as an argument, which can be any one of A, B, or C). In case of animation images, in S5105, it is decided whether to terminate the rendering process, with control going back to S5104 if the rendering of the animation is continued and advancing to S5106 if the rendering is terminated.

In S5106, the rendering processor 100 sets up a parameter designating the interframe interpolation scheme as the frame rate conversion scheme in the EN_n register (n is a value given as an argument, which can be any one of A, B, or C).

As explained above, in accordance with the present embodiment, even when the rendering processor 100 generates image data, the interpolation frame data is still generated if the volume of data that the rendering processor 100 transmits to, and receives from, the DRAM 101 does not exceed a predetermined threshold value.

As a result, if the rendering processor 100 does not require a lot of transmission bandwidth in the DRAM 101, the image quality of the video data is improved.

Sixth Embodiment

In a sixth embodiment, when the rendering processor 100 renders image data, it is not the image processing apparatus, but the controller of the display device that carries out frame rate acceleration based on the doubling scheme, thereby increasing the transmission bandwidth that can be used by the rendering processor 100.

Figure 23:
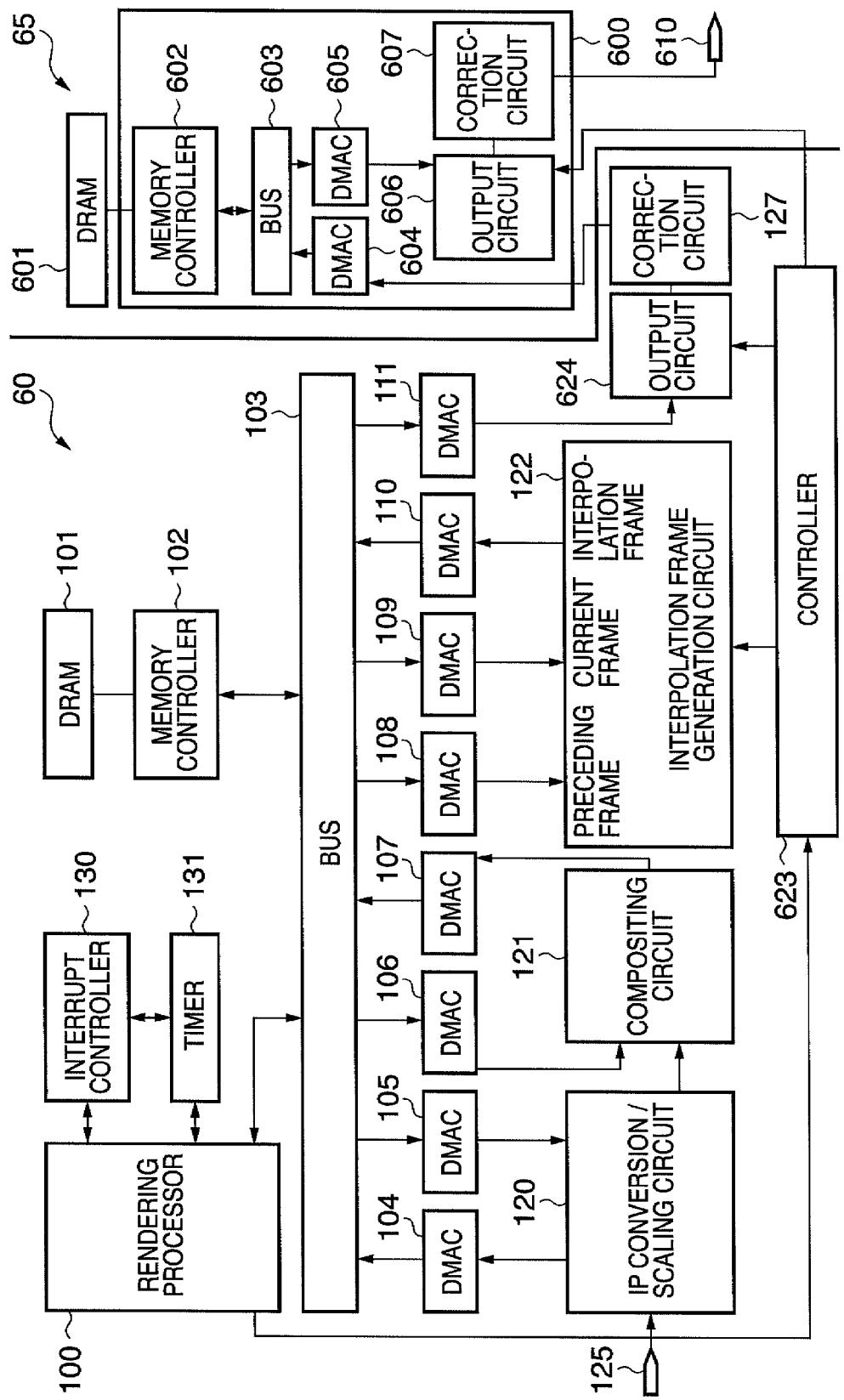
FIG. 23 is a diagram illustrating the configuration of an image processing apparatus and a display device controller according to a sixth embodiment.

FIG. 23 is a diagram illustrating the configuration of an image processing apparatus 60 and a display device controller 65 according to the sixth embodiment. In FIG. 6, the same symbols are assigned to the same structural elements as in the image processing apparatus 10 and their explanation is omitted.

The reference numeral 600 designates an integrated circuit used to carry out correction processing on video data along with controlling a display device (display panel). The reference numeral 601 designates a DRAM, 602 designates a memory controller, 603 designates a bus, and 604 and 605 designate direct memory access controllers (DMACs).

The reference numeral 623 designates a controller outputting control signals to the integrated circuit 600. The reference numeral 624 designates an output circuit reading out and outputting video data from the DRAM 101 at 120 fps or 60 fps.

The reference numeral 610 designates an output port connected to the drive circuit of the display panel.

When the rendering processor 100 does not perform image data rendering, the DMAC 107 performs a write-transmission of the video data to the DRAM 101 as original frame data. The interpolation frame generation circuit 122 reads out the original frame data from the DRAM 101, generates interpolation frame data, and performs a write-transmission of the interpolation frame data to the DRAM 101. The output circuit 624 successively reads out the original frame data and interpolation frame data and outputs them to the correction circuit 127 at a 120-fps frame rate. The output of the correction circuit 127 is input to the integrated circuit 600.

The DMAC 604 transmits the received video data to the memory controller 602 by way of the bus 603, with the memory controller 602 recording the video data in the DRAM 601. The DMAC 605 reads it out from the DRAM 601 by way of the memory controller 602 and bus 603 at a frame rate of 120 fps and outputs it to the output circuit 606. The video data output by the output circuit 606 is subjected to correction processing in the correction circuit 607 and output via the output port 610.

On the other hand, when the rendering processor 100 performs image data rendering, the DMAC 107 performs a write-transmission of the video data to the DRAM 101 as original frame data. The controller 623 controls the interpolation frame generation circuit 122 to halt the generation of interpolation frame data. Moreover, the output circuit 624 is controlled to read out the original frame data from the DRAM 101 at the frame rate of the video data (e.g. 60 fps). Furthermore, the output circuit 606 is controlled to repeatedly read out the original frame data from the DRAM 601 at a higher speed (e.g. 120 fps) than the frame rate of the video data.

Thus, in the present embodiment, when the rendering processor 100 renders the image data, the output circuit 606 performs the frame doubling process using the DRAM 601. The output circuit 624 does not perform the frame doubling process. For this reason, the transmission bandwidth of the DRAM 101 consumed by the output circuit 624 is reduced in half.

Therefore, the transmission bandwidth of the DRAM 101 that can be used by the rendering processor 100 increases, suppressing the occurrence of situations where generation of image data representing high-quality images is impossible due to a lack of transmission bandwidth.

Other Embodiments

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a floppy disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-067596, filed on Mar. 15, 2007, which is hereby incorporated by reference herein in its entirety.

What is claimed is:

1. An apparatus comprising:
a memory which successively stores frame data of video data;
an interpolating unit which generates interpolation frame data which is inserted between the frame data and stores the interpolation frame data in the memory;
a readout unit which successively reads out the frame data and the interpolation frame data from the memory at a frame rate higher than a frame rate of the video data;
a generating unit which generates image data which is composited with the frame data and stores the image data in the memory; and
a control unit which controls the interpolating unit to carry out the generation of the interpolation frame data,
wherein, if a pixel count of the image data is more than a predetermined threshold value, the control unit controls the interpolating unit to halt the generation of the interpolation frame data and controls the readout unit to read out the frame data in duplicate instead of the interpolation frame data.

2. An apparatus comprising:
a memory which successively stores frame data of video data
an interpolating unit which generates interpolation frame data which is inserted between the frame data and stores the interpolation frame data in the memory;
a readout unit which successively reads out the frame data and the interpolation frame data from the memory at a frame rate higher than a frame rate of the video data;
a generating unit which generates image data which is composited with the frame data and stores the image data in the memory; and
a control unit which controls the interpolating unit to carry out the generation of the interpolation frame data for an area other than an area in the frame data where the image data is composited, and controls the readout unit to read out the frame data in duplicate instead of the interpolation frame data for the area in the frame data where the image data is composited.

3. An apparatus comprising:
a memory which successively stores frame data of video data
an interpolating unit which generates interpolation frame data which is inserted between the frame data and stores the interpolation frame data in the memory;
a readout unit which successively reads out the frame data and the interpolation frame data from the memory at a frame rate higher than a frame rate of the video data;
a generating unit which generates image data which is composited with the frame data and stores the image data in the memory; and
a control unit which controls the interpolating unit to carry out the generation of the interpolation frame data for an area other than an area in the frame data where the image data is composited and for an area where a degree of transparency of the composited image data is not less than a predetermined degree, and controls the readout unit to read out the frame data in duplicate instead of the interpolation frame data for the area where the degree of transparency of the composited image data is less than the predetermined degree.

4. An apparatus comprising:
a memory which successively stores frame data of video data;
an interpolating unit which generates interpolation frame data which is inserted between the frame data and stores the interpolation frame data in the memory;
a readout unit which successively reads out the frame data and the interpolation frame data from the memory at a frame rate higher than a frame rate of the video data;
a generating unit which generates image data which is composited with the frame data and stores the image data in the memory; and
a control unit which controls the interpolating unit to carry out the generation of the interpolation frame data if a volume of the image data that the generating unit transmits to and receives from the memory is not more than a predetermined threshold value,
wherein, if a volume of the image data that the generating unit transmits to and receives from the memory is more than the predetermined threshold value, the control unit controls the interpolating unit to halt the generation of the interpolation frame data and controls the readout unit to read out the frame data in duplicate instead of the interpolation frame data.

5. An apparatus comprising:
a storage unit which successively stores frame data of video data in a memory;
a first converting unit which converts the frame data in a first format to a second format utilizing a smaller data volume than the first format;
an interpolating unit which generates interpolation frame data which is inserted between the frame data in the first format or the second format and stores the interpolation frame data in the memory;
a second converting unit which converts the interpolation frame data and the frame data in the second format to the first format;
a readout unit which successively reads out the frame data and interpolation frame data from the memory at a frame rate higher than a frame rate of the video data;
a generating unit which generates image data which is composited with the frame data and stores the image data in the memory; and
a control unit which, in response to output of display-related characteristics of the image data, controls the storage unit to store the frame data after conversion to the second format with the first converting unit, controls the interpolating unit to generate the interpolation frame data in the second format, and controls the second converting unit to convert the interpolation frame data and the frame data in the second format to the first format prior to readout by the readout unit.

6. The apparatus according to claim 5, wherein no control is exercised by the control unit if a pixel count of the image data is not more than a predetermined threshold value.

7. A method comprising:
successively storing frame data of video data in a memory;
generating interpolation frame data which is inserted between the frame data and storing the interpolation frame data in the memory;
successively reading out the frame data and the interpolation frame data from the memory at a frame rate higher than a frame rate of the video data;
generating image data which is composited with the frame data and storing the image data in the memory;
controlling the generation of the interpolation frame data; and
if a pixel count of the image data is more than a predetermined threshold value, halting the generation of the interpolation frame data and controlling the reading out of the frame data in duplicate instead of the interpolation frame data.

8. A method comprising:
successively storing frame data of video data in a memory;
generating interpolation frame data which is inserted between the frame data;
storing the interpolation frame data in the memory;
successively reading out the frame data and the interpolation frame data from the memory at a frame rate higher than a frame rate of the video data;
generating image data which is composited with the frame data;
storing the image data in the memory;
controlling the generation of the interpolation frame data for an area other than an area in the frame data where the image data is composited; and
controlling the reading out of the frame data in duplicate instead of the interpolation frame data for the area in the frame data where the image data is composited.

9. A method comprising:
successively storing frame data of video data in a memory;
generating interpolation frame data which is inserted between the frame data;
storing the interpolation frame data in the memory;
successively reading out the frame data and the interpolation frame data from the memory at a frame rate higher than a frame rate of the video data;
generating image data which is composited with the frame data;
storing the image data in the memory;
controlling the generation of the interpolation frame data for an area other than an area in the frame data where the image data is composited and for an area where a degree of transparency of the composited image data is not less than a predetermined degree; and
controlling the reading out of the frame data in duplicate instead of the interpolation frame data for the area where the degree of transparency of the composited image data is less than the predetermined degree.

10. A method comprising:
successively storing frame data of video data in a memory;
generating interpolation frame data which is inserted between the frame data;
storing the interpolation frame data in the memory;
successively reading out the frame data and the interpolation frame data from the memory at a frame rate higher than a frame rate of the video data;
generating image data which is composited with the frame data;
storing the image data in the memory;
controlling the generation of the interpolation frame data if a volume of the image data that is transmitted to and received from the memory is not more than a predetermined threshold value; and
if the volume of the image data that is transmitted to and received from the memory is more than the predetermined threshold value, halting the generation of the interpolation frame data and controlling the reading out of the frame data in duplicate instead of the interpolation frame data.

11. A method comprising:
successively storing frame data of video data in a memory;
converting the frame data in a first format to a second format utilizing a smaller data volume than the first format;
generating interpolation frame data which is inserted between the frame data in the first format or the second format;
storing the interpolation frame data in the memory;
converting the interpolation frame data and the frame data in the second format to the first format;
reading out the frame data and the interpolation frame data from the memory at a frame rate higher than a frame rate of the video data;
generating image data which is composited with the frame data;
storing the image data in the memory; and
in response to output of display-related characteristics of the image data, controlling the storing of the frame data after conversion to the second format, controlling the generation of interpolation frame data in the second format, and controlling the conversion of the interpolation frame data and the frame data in the second format to the first format prior to readout.

* * * * *